United States Patent
Mahmoodi et al.

(10) Patent No.: US 10,397,829 B2
(45) Date of Patent: Aug. 27, 2019

(54) SYSTEM APPARATUS AND METHODS FOR COGNITIVE CLOUD OFFLOADING IN A MULTI-RAT ENABLED WIRELESS DEVICE

(71) Applicant: The Trustees of the Stevens Institute of Technology, Hoboken, NJ (US)

(72) Inventors: Seyed Eman Mahmoodi, Weehawken, NJ (US); K. P. Subbalakshmi, Holmdel, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 15/364,367

(22) Filed: Nov. 30, 2016

(65) Prior Publication Data

US 2017/0164237 A1    Jun. 8, 2017

Related U.S. Application Data

(60) Provisional application No. 62/262,624, filed on Dec. 3, 2015.

(51) Int. Cl.
| | |
|---|---|
| *H04W 28/08* | (2009.01) |
| *H04W 24/08* | (2009.01) |
| *H04W 52/02* | (2009.01) |
| *H04W 88/06* | (2009.01) |

(52) U.S. Cl.
CPC ......... *H04W 28/08* (2013.01); *H04W 24/08* (2013.01); *H04W 52/0251* (2013.01); *H04W 88/06* (2013.01); *Y02D 70/00* (2018.01); *Y02D 70/1262* (2018.01); *Y02D 70/142* (2018.01); *Y02D 70/164* (2018.01); *Y02D 70/22* (2018.01)

(58) Field of Classification Search
CPC ...... H04L 67/10–67/1038; G06F 9/50–9/5055
See application file for complete search history.

(56) References Cited

U.S. PATENT DOCUMENTS

| | | | |
|---|---|---|---|
| 2014/0310709 A1* | 10/2014 | Nirantar | G06F 9/5027 718/1 |
| 2015/0106823 A1* | 4/2015 | Canoy | G06F 9/505 718/105 |
| 2016/0092246 A1* | 3/2016 | Lagerblad | G06F 9/44526 719/331 |

OTHER PUBLICATIONS

Abolfazli, S. et al., An experimental analysis on cloud-based mobile augmentation in mobile cloud computing, IEEE Transactions on Consumer Electronics, vol. 60, No. 1, (2014), pp. 146-154.

(Continued)

*Primary Examiner* — Pao Sinkantarakorn
(74) *Attorney, Agent, or Firm* — Greenberg Traurig, LLP

(57) ABSTRACT

A system, method and apparatus having a mobile device with a plurality of radio access technologies, a server computer in the cloud running a cognitive offloader and cloud scheduler improves the execution time and reduces energy use of an application program residing on or accessible to the mobile device and having a plurality of components by apportioning executable tasks and routing data between the mobile device and the server computer based upon a cognitive offloader algorithm aware of dynamic parameters such as CPU and memory use, energy costs for transmissions and measurements of connectivity. The scheduling of tasks apportioned between the computing devices in the system may be enlightened by a component dependency graph of the application that is used by the offloader algorithm.

27 Claims, 9 Drawing Sheets

(56) References Cited

OTHER PUBLICATIONS

Balakrishnan P. et al., Energy-efficient mapping and scheduling of task interaction graphs for code offloading in mobile cloud computing, in IEEE/ACM 6th International Conference on Utility and Cloud Computing (UCC), Dec. 2013, pp. 34-41.
Barbarossa, S. et al., Computation offloading for mobile cloud computing based on wide cross-layer optimization, in Future Network and Mobile Summit (FutureNetworkSummit), Jul. 2013, pp. 1-10.
Chun, B.G. et al., Clonecloud: elastic execution between mobile device and cloud, in Proceedings of the sixth conference on Computer systems, 2011, pp. 301-314.
Cuervo, E. et al., MAUI: Making smartphones last longer with code offload, in International Conference on Mobile Systems, Applications, and Services. ACM, 2010, pp. 49-62.
Demestichas, P. et al., 5g on the horizon: Key challenges for the radio-access network, IEEE Vehicular Technology Magazine, vol. 8, No. 3, pp. 47-53, Sep. 2013.
Deng, S. et al., Computation offloading for service workflow in mobile cloud computing, IEEE Transactions on Parallel and Distributed Systems, vol. PP, No. 99, pp. 1-1, Early access 2015.
Gu, X, et al., Adaptive offloading for pervasive computing, EEE Pervasive Computing, vol. 3, No. 3, pp. 66-73, Third quarter 2004.
Hall, L.A. et al., Scheduling to minimize average completion time: Off-line and on-line approximation algorithms, 1996.
Huang, D. et al., A dynamic offloading algorithm for mobile computing, IEEE Transactions on Wireless Communications, vol. 11, No. 6, pp. 1991-1995, Jun. 2012.
Kovachev, D. et al., Adaptive computation offloading from mobile devices into the cloud, in IEEE International Symposium on Parallel and Distributed Processing with Applications (ISPA), 2012, pp. 784-791.
Lin, Y. et al., Time-and-energy-aware computation offloading in handheld devices to coprocessors and clouds, IEEE Systems Journal, vol. 9, No. 2, pp. 393-405, Jun. 2015.
Liu, F. et al., Gearing resource-poor mobile devices with powerful clouds: architectures, challenges, and applications, IEEE Wireless Communications, vol. 20, No. 3, (2016), pp. 14-22.
Ma, X. et al., When mobile terminals meet the cloud: computation offloading as the bridge, IEEE Network, vol. 27, No. 5, pp. 28-33, Sep. 2013.
Mahmoodi, S.E. et al., A Time-Adaptive Heuristic for Cognitive Cloud Offloading in Multi-RAT Enabled Wireless Devices, IEEE Transactions on Cognitive Communications and Networking, 2,2, (2016) 194-207.
Mahmoodi, S.E. et al., Cloud offloading for multi-radio enabled mobile devices, in IEEE International Communication Conference (ICC), Jun. 2015, pp. 1-6.
Mahmoodi, S.E. et al., Optimal joint scheduling and cloud offloading for mobile applications, Submitted to IEEE Transactions on Cloud Computing special issue on Mobile Clouds, Jun. 2015.
Merlin, S. et al., Resource allocation in multi-radio multi-channel multi-hop wireless networks, in The IEEE Conference on Computer Communications (INFOCOM), Apr. 2008, pp. 1283-1291.
Nir, M. et al., An energy optimizing scheduler for mobile cloud computing environments, in IEEE Conference on Computer Communications Workshops (INFOCOM), Apr. 2014, pp. 404-409.
Paolo Di Lorenzo, S.S. et al., Joint optimization of radio resources and code partitioning in mobile cloud computing, IEEE Transactions on Parallel and Distributed Systems, pp. 1-1, Under second round of review 2015.
Ramachandran, K. et al., Interference-aware channel assignment in multi-radio wireless mesh networks, in IEEE Conference on Computer Communications (INFOCOM), 2006, pp. 1-12.
Shi, C. et al., COSMOS: Computation offloading as a service for mobile devices, in Proceedings of the ACM International Symposium on Mobile Ad Hoc Networking and Computing, ser. MobiHoc '14. New York, NY, USA: ACM, 2014, pp. 287-296.
Shi, C. et al., IC-Cloud: Computation offloading to an intermittently connected cloud, SCS Technical Report in Georgia Institute of Technology, 2013. [Online]. Available: http://hdl.handle.net/1853/45985.
Shu, P. et al., eTime: Energy efficient transmission between cloud and mobile devices, in IEEE Proceedings of INFOCOM, Apr. 2013, pp. 195-199.
Spuri M. et al., Scheduling aperiodic tasks in dynamic priority systems, Real-Time Systems, vol. 10, pp. 179-210, 1996.
Toma A.S.M., et al., Computation offloading for frame-based real-time tasks under given server response time guarantees, Leibniz Transactions on Embedded Systems, vol. 1, No. 2, pp. 1-21, Nov. 2014.
Vallina-Rodriguez, N. et al., Energy management techniques in modern mobile handsets, IEEE Communications Surveys Tutorials, vol. 15, No. 1, (2013), pp. 179-198.
Zhang, W. et al., Collaborative task execution in mobile cloud computing under a stochastic wireless channel, IEEE Transactions on Wireless Communications, vol. 14, No. 1, pp. 81-93, Jan. 2015.
Zhang, W. et al., Energy-efficient scheduling policy for collaborative execution in mobile cloud computing, in IEEE Proceedings of INFOCOM, Apr. 2013, pp. 190-194.
Zhang, W. et al., Energy optimal mobile cloud computing under stochastic wireless channel, IEEE Transactions on Wireless Communications, vol. 12, No. 9, pp. 4569-4581, Sep. 2013.
V. Bhandari, et al., "Scheduling in Multi-Channel Wireless Networks," K. Kant, et al., (Eds.): Distributed Computing and Networking, Lecture Notes in Computer Science, vol. 5935, pp. 6-17, Springer-Verlag, Berlin Heidelberg, (2010).
S. Kosta, et al., "Thinkair: Dynamic resource allocation and parallel execution in the cloud for mobile code offloading," IEEE Proceedings of INFOCOM, 2012, pp. 945-953.
W. Gao, et al., "On Exploiting Dynamic Execution Patterns for Workload Offloading in Mobile Cloud Applications," IEEE 22nd International Conference on Network Protocols (ICNP), 2014, pp. 1-12.
H. Wu, et al., "Tradeoff between Performance Improvement and Energy Saving in Mobile Cloud Offloading Systems," IEEE International Conference on Communications 2013: IEEE ICC'13—1st International Workshop on Mobile Cloud Networking and Servies (MCN), 2013, pp. 728-732.
Y. Wen, et al., "Energy-Optimal Mobile Application Execution: Taming Resource-Poor Mobile Devices with Cloud Clones," IEEE Proceedings of INFOCOM, 2012, pp. 2716-2720.
M. Zorzi, et al., "Cognition-Based Networks: a New Perspective on Network Optimization Using Learning and Distributed Intelligence," IEEE Access, vol. 3, pp. 1512-1530, Aug. 21, 2015.
G. Chen, et al., "Studying Energy Tradeoffs in Offloading Computation/Compilation in Java-Enabled Mobile Devices," IEEE Transactions on Parallel and Distributed Systems, vol. 15, No. 9, pp. 795-809, Sep. 2004.
H. T. Dinh, et al., "A survey of mobile cloud computing: architecture, applications, and approaches," Wireless communications and Mobile Computing, vol. 13, No. 18, pp. 1587-1611, Oct. 11, 2013.
B. Chun, et al., "Augmented Smartphone Applications Through Clone Cloud Execution," Proceedings of the 12th Conference on Hot Topics in Operating Systems, ser. HotOS'09, 2009, pp. 8-8.
J. Liu, et al., "Energy Efficient GPS Sensing with Cloud Offloading," Proceedings of the ACM Conference on Embedded Network Sensor Systems, ser. SenSys '12, Nov. 6-9, 2012.
P. Rubin, Sep. 2014. [Online]. http://orinanobworld.blogspot.de/2010/10/binary-variables-and-quadratic-terms.html.
M. J. Neely, "Stochastic Network Optimization with Application to Communication and Queueing Systems," Morgan and Claypool Publishers, 2010.
L. Georgiadis, et al., "Resource Allocation and Cross-Layer Control in Wireless Networks," Foundations and Trends in Networking., vol. 1, No. 1, (2006) pp. 1-144.
D. Cordeiro, et al., "Random graph generation for scheduling simulations," Proceedings of the International ICST Conference on Simulation Tools and Techniques, vol. 10, No. 60, pp. 60:1-60:10, 2010.

(56) References Cited

OTHER PUBLICATIONS

J. K. Ousterhout, "Scripting: Higher Level Programming for the 21st Century," IEEE Computer Magazine, pp. 23-30, Mar. 1998.

* cited by examiner

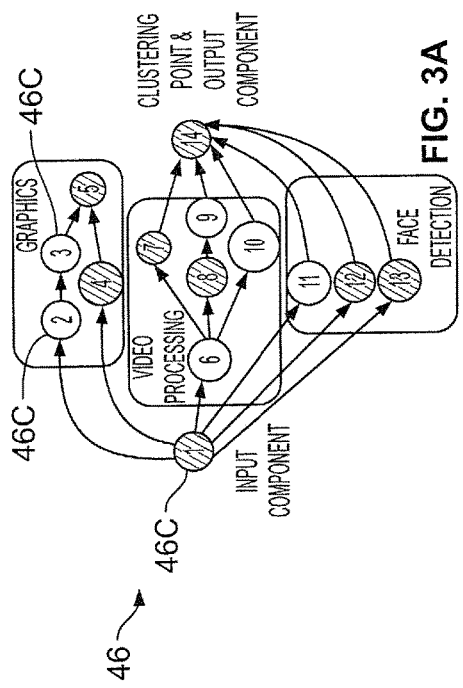
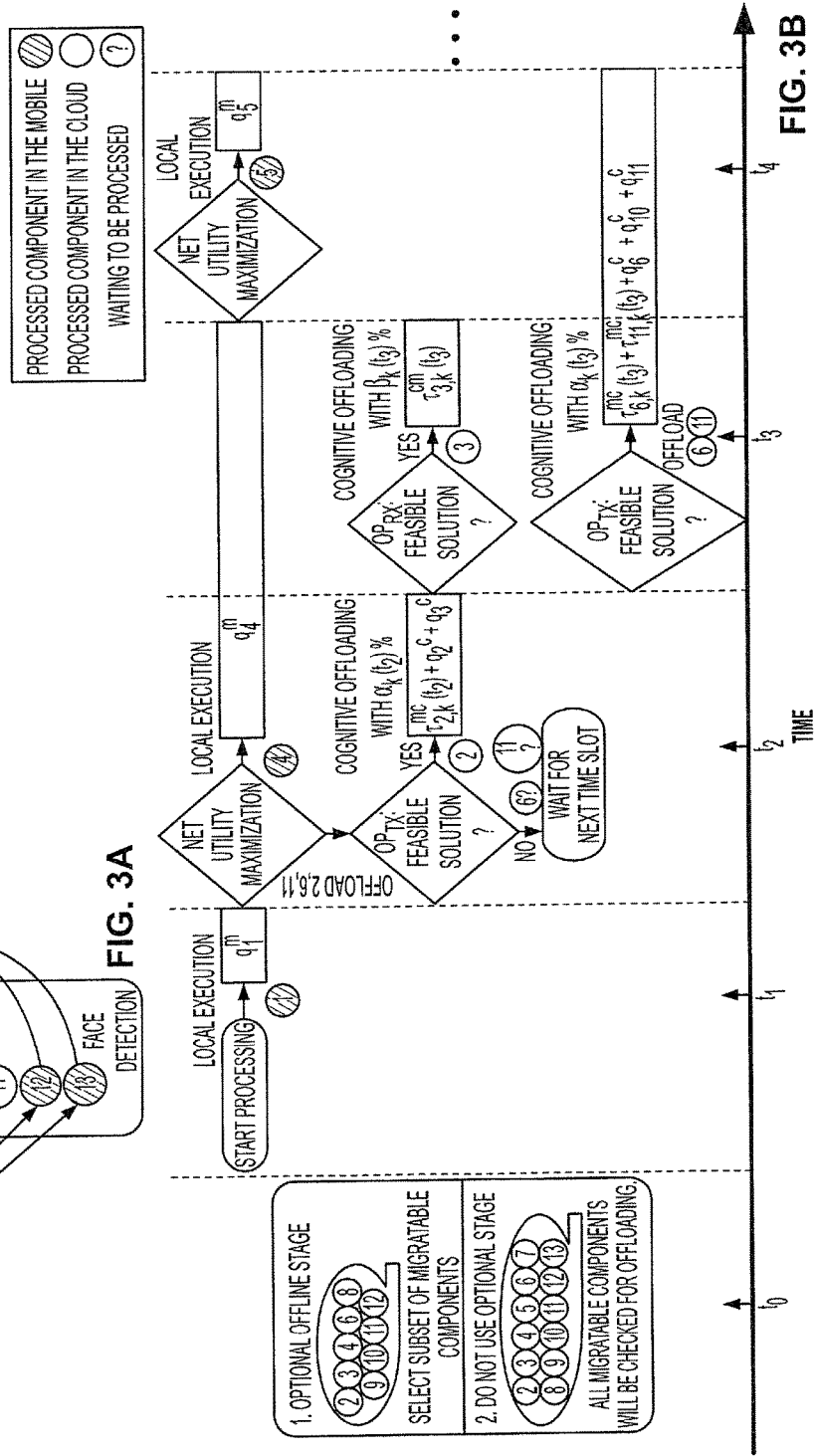

SYSTEM APPARATUS AND METHODS FOR COGNITIVE CLOUD OFFLOADING IN A MULTI-RAT ENABLED WIRELESS DEVICE

CROSS-REFERENCE TO RELATED APPLICATION

The present application claims the benefit of U.S. Provisional Application No. 62/262,624, filed Dec. 3, 2015, entitled SYSTEM APPARATUS AND METHODS FOR COGNITIVE CLOUD OFFLOADING IN A MULTI-RAT ENABLED WIRELESS DEVICE. The disclosure of the foregoing application is incorporated herein by reference in its entirety for all purposes.

FIELD

The present invention relates to wireless devices and processes executed on wireless devices and more particularly, to wireless devices having computers capable of executing application programs and connecting to a network and having multiple radio access technologies (RATs) through which wireless communication can be conducted.

BACKGROUND

With the advent of 5G wireless communications, the expectations from the mobile devices have increased. Sophisticated and computationally intensive mobile applications, such as augmented reality, speech recognition, 3D interactive gaming, context awareness, natural language translation, healthcare sensing and analysis are beginning to be supported on the mobile device. S. Abolfazli, Z. Sanaei, M. Alizadeh, A. Gani, and F. Xia, "An experimental analysis on cloud-based mobile augmentation in mobile cloud computing," *IEEE Transactions on Consumer Electronics*, vol. 60, no. 1, pp. 146-154, February 2014. This multi-tasking puts significant effective constraints on resources like memory and battery power available to each of the applications supported by the mobile devices. Accordingly, apparatus and methods for utilizing available resources efficiently are desirable.

SUMMARY

The disclosed subject matter relates to cognitive computation offloading, joint scheduling-offloading, mobile cloud computing, multi-RAT offloading and spectrum aware mobile computing. In one embodiment, processing and data required for an application are divided between a wireless device and at least one remote computer connected wireless to the wireless device.

In one embodiment, the remote computer is connected to a network. In one embodiment a time-adaptive heuristic is used to ascertain the distribution of processing and data, based upon local and remote CPU and memory use, as well as connectivity/capacity measures on the RATS.

In one embodiment, the schedule of tasks is taken into consideration in the distribution of processing and data. In one embodiment, the distribution is dynamically assessed based upon changing values of capacity for storage, processing and data transfer.

In one embodiment, a method for distributing a plurality of executable processing components and data used by an application program between a first computer and at least one second computer, the first and second computer connected by a plurality of radio interfaces, includes the steps of: automatically identifying executable processing components of the application program and data used by the application program to be offloaded to the second computer for execution; automatically ascertaining which of the plurality of radio interfaces for performing the step of offloading to the second computer; determining the relative percentage of the components and data that are to be communicated on each of the plurality of radio interfaces; offloading the components and data identified from the first computer to the second computer over at least one of the plurality of radio interfaces; executing the components offloaded in the second computer, producing processed data; communicating the processed data to the first computer; and using the processed data communicated in the application program running on the first computer.

In one embodiment, at least a portion of the processing components are executed in the first computer and another portion of the processing components are executed in the second computer.

In one embodiment, the step of automatically identifying is based in part upon CPU utilization in the first computer.

In one embodiment, the step of automatically identifying is based in part upon memory utilization in the first computer.

In one embodiment, the step of automatically ascertaining is based in part upon connectivity strength of each of the plurality of radio interfaces.

In one embodiment, the step of automatically ascertaining is based in part upon data flow capacity of each of the plurality of radio interfaces.

In one embodiment, the first computer is a mobile computing device and the second computer is a server computer.

In one embodiment, the step of automatically identifying is based in part upon connectivity strength and data flow capacity of each of the plurality of radio interfaces.

In one embodiment, the step of identifying is based in part on the comparative amounts of energy consumed by executing a given processing component on the first computer compared to amount of energy used in the steps of offloading and communicating.

In one embodiment, further including the step of scheduling the offloading and execution of each of the plurality of components the application based at least partly on a dependency of the plurality of components one to another.

In one embodiment, the steps of identifying and ascertaining are partly based on the data communication capacity from the second computer to the first computer during the step of communicating.

In one embodiment, further including the step of automatically ascertaining which of the plurality of radio interfaces are used to perform the step of communicating the processed data produced to the first computer.

In one embodiment, the step of automatically identifying is based in part upon a battery life of the first computer.

In one embodiment, the dependency of the plurality of components is modeled by a component dependency graph.

In one embodiment, further including a step of executing at least a portion of a component in the first computer at the same time as at least a portion of a component is executed in the second computer during the step of executing, whereby parallel processing occurs in the first computer and the second computer.

In one embodiment, the step of offloading is conducted opportunistically with offloading occurring while at least one radio interface is operational, ceasing when no radio interface is operational and resuming when at least one radio interface becomes operational.

In one embodiment, at least a portion of the processing components are executed in the first computer and another portion of the processing components are executed in the second computer, the execution of processing components in the first computer and the second computer occurring opportunistically, such that interruptions in the operability of the plurality of radio interfaces does not impede execution of steps of the processing components that are executable without further communication between the first computer and the second computer and allowing for parallel processing in the first computer and the second computer.

In one embodiment, the step of offloading is conducted over all available radio interfaces simultaneously.

In one embodiment, the step of communicating is conducted over all available radio interfaces simultaneously.

In one embodiment, a system capable of executing an application program having a plurality of executable components, includes: a first computer with a processor and memory capable of executing at least one of the executable components; a second computer with a processor and memory capable of executing at least one of the executable components; a plurality of radio interfaces supporting communication between the first computer and the and second computer; and a cognitive offloader and scheduler residing on at least one of the first computer or the second computer, the cognitive offloader and scheduler capable of automatically identifying executable processing components of the application program and data used by the application program to be offloaded to the second computer for execution; automatically ascertaining which of the plurality of radio interfaces for performing the step of offloading to the second computer; and determining the relative percentage of the components and data that are to be communicated on each of the plurality of radio interfaces based upon dependencies between each of the plurality of executable components and comparative net utility as affected by energy, memory and CPU cycle costs for the first computer for executing a given executable component at a given time (t).

In one embodiment, the first computer is a mobile computing device and the second computer is a server computer, the cognitive cloud offloader residing on the server computer.

BRIEF DESCRIPTION OF THE DRAWINGS

For a more complete understanding of the present disclosure, reference is made to the following detailed description of exemplary embodiments considered in conjunction with the accompanying drawings.

FIG. 3A is a component dependency graph (CDG) of an exemplary mobile application having fourteen components.

FIG. 3B is a portion of a diagram of component scheduling of the fourteen component application referred to in FIG. 3A.

DETAILED DESCRIPTION OF EXEMPLARY EMBODIMENTS

Figure 1:
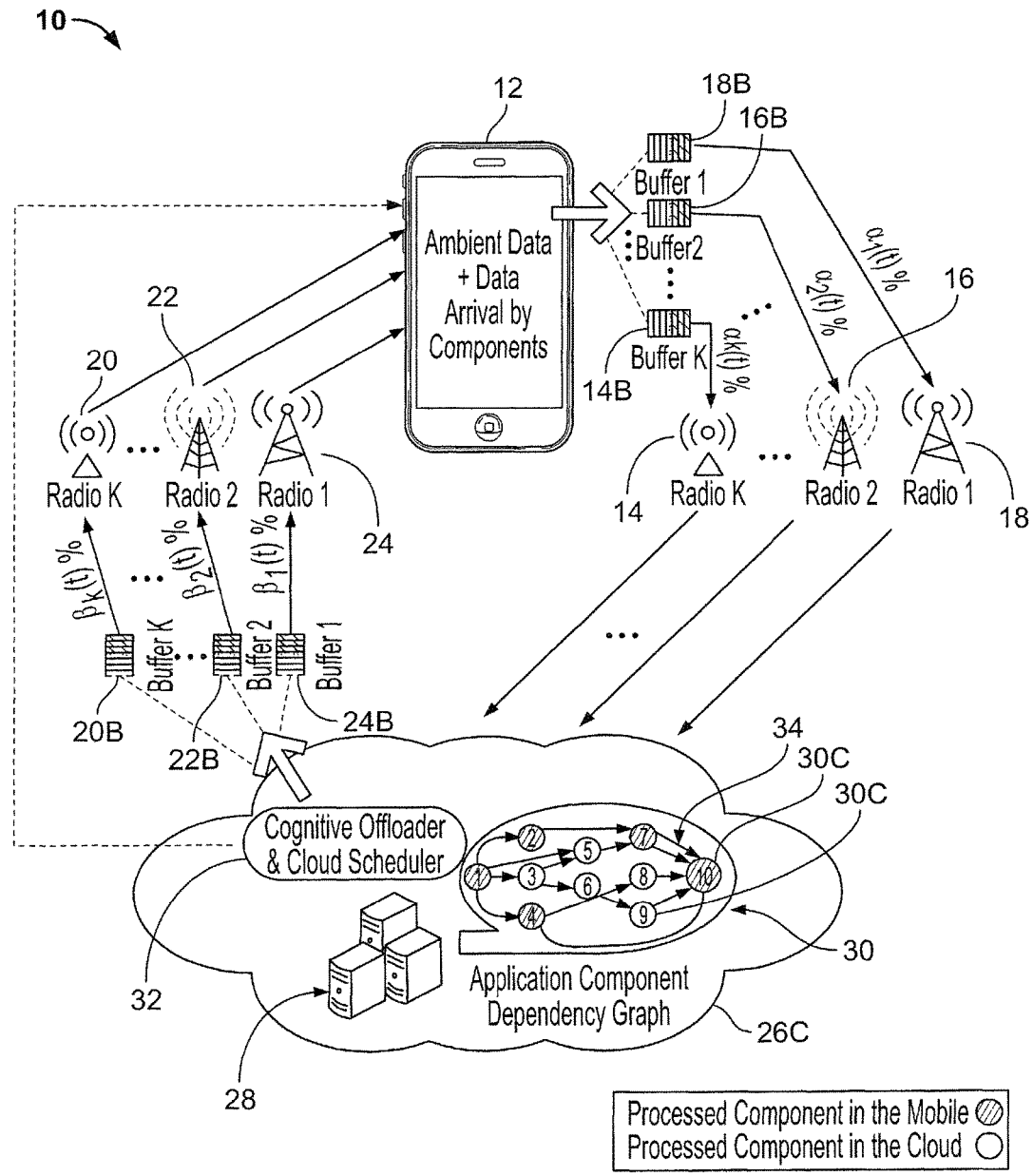
FIG. 1 is schematic diagram of a system in accordance with an embodiment of the present disclosure supporting cognitive offloading for multi-RAT enabled wireless devices.

In the present disclosure, the term "cognitive cloud offloading" may be defined as computations that are partially offloaded to a cloud, based on online wireless parameters, with simultaneous access to all available radio interfaces of mobile devices. This disclosure proposes a time-adaptive and wireless-aware heuristic to efficiently manage partial computational offloading of computationally intensive applications to a remote cloud with a goal of reducing the energy consumption on the mobile device, execution time of the application and efficient use of the multiple radio interfaces available at the device. To this end, the disclosed algorithms simultaneously determine: (i) which component to the application should execute locally and which needs to be offloaded to the remote cloud; (ii) how much of the associated data should be sent via each available interface of the multi-RAT device and (iii) the scheduling order of the components of the applications with arbitrary component dependencies.

A net utility function is described that trades off the mobile device resources (battery, CPU, and memory) saved by offloading to the cloud with the penalty of realtime communication costs such as latency and communication energy, subject to constraints that ensure queue stability of radio interfaces. Simulations have been performed using real data measurements from an HTC smartphone running multi-component applications, using Amazon EC2 as the cloud and two radios, LTE and WiFi. Results show that the cognitive approach provides 7% higher net utility in comparison to a simple use of multiple radio interfaces due to selection of the best interface to use for data transfer. The scalability of the proposed heuristic is further analyzed using various real delay values, communication power levels, sizes of component dependency graphs, and energy-delay trade-off factors.

An aspect of the present disclosure is the recognition that although offloading computation, F. Liu, P. Shu, H. Jin, L. Ding, J. Yu, D. Niu, and B. Li, "Gearing resource-poor mobile devices with powerful clouds: architectures, challenges, and applications," *IEEE Wireless Communications*, vol. 20, no. 3, pp. 14-22, June 2013, to a remote resource-rich cloud has existed as a solution to this problem in various forms, N. Vallina-Rodriguez and J. Croweroft, "Energy management techniques in modern mobile handsets," *IEEE Communications Surveys Tutorials*, vol. 15, no. 1, pp. 179-198, First quarter 2013. B.-G. Chun, S. Ihm, P. Maniatis, M. Naik, and A. Patti, "Clonecloud: elastic execution between mobile device and cloud," in *Proceedings of the sixth conference on Computer systems*, 2011, pp. 301-314. X. Gu, K. Nahrstedt, A. Messer, I. Greenberg, and D. Milojicic, "Adaptive offloading for pervasive computing," *IEEE Pervasive Computing*, vol. 3, no. 3, pp. 66-73, Third quarter 2004. Offloading will also place a further burden on the already limited spectrum resources since data will have to be transferred between the mobile devices and the cloud in order to successfully deliver the application on the mobile device. Multiple radio access technology (multi-RAT) enabled mobile devices are poised to become a mainstay of the future of wireless networking. P. Demestichas, A. Georgakopoulos, D. Karvounas, K. Tsagkaris, V. Stavroulaki, J. Lu, C. Xiong, and J. Yao, "5g on the horizon: Key challenges for the radio-access network," *IEEE Vehicular Technology Magazine*, vol. 8, no. 3, pp. 47-53, September 2013. The present disclosure proposes use of this newly emerging technology in a cloud offloading solution. An aspect of the present disclosure is the concept of cognitive cloud offloading where the offloading algorithm not only decides which components of a complex application should be offloaded and which should run locally, but also which radio interfaces must be used in the associated data transfers and what percentage of the data should be communicated through each interface. Cognitive use of all the wireless interfaces at the same time leads to a higher throughput of the network (see FIG. 1). The term cloud offloading can mean data flow offloading, S. Merlin, N. Vaidya, and M. Zorzi, "Resource allocation in multi-radio multi-channel multi-hop wireless networks," in *The IEEE Conference on Computer Communications (INFOCOM)*, April 2008, pp. 1283-1291; V. Bhandari and N. H. Vaidya, "Scheduling in multi-channel wireless networks," in *Distributed Computing and Networking*, ser. Lecture Notes in Computer Science, K. Kant, S. Pemmaraju, K. Sivalingam, and J. Wu, Eds. Springer Berlin Heidelberg, 2010, vol. 5935, pp. 6-17, or offloading computationally intense tasks to the cloud X. Ma, Y. Zhao, L. Zhang, H. Wang, and L. Peng, "When mobile terminals meet the cloud: computation offloading as the bridge." In this disclosure, unless indicated otherwise, we refer to the latter. The inventors' previous work in this area appeared in S. E. Mahmoodi, K. P. Subbalakshmi, and V. Sagar, "Cloud offloading for multi-radio enabled mobile devices," in *IEEE International Communication Conference (ICC)*, June 2015, pp. 1-6 where this problem was considered when all the wireless parameters were collected and the optimal one shot solution was derived. In this disclosure, we move to a more realistic extension of the problem, in two ways: (1) we consider more general dependencies between the components of the application (see below for more on component dependency graphs) and (2) we propose a time-adaptive algorithm that varies with the changes in the wireless network conditions over time. This disclosure teaches a heuristic online (time adaptive) scheme to optimally schedule the application's components for offloading, while simultaneously optimizing the percentage of data to be sent by the mobile and the cloud via each wireless interface. In accordance with an aspect of the present disclosure, a comprehensive model for the utility function trades-off resources saved by remote execution (such as energy, memory, and CPU consumption by the mobile device) with the cost of communication required for offloading (such as energy consumed by offloading and the data queue length at multiple radio interfaces). A solution can be implemented in two ways: (i) a two stage algorithm where some of the components are eliminated as unsuitable for offloading at the outset, maximizing the instantaneous utility values at time $t_0$ (offline stage). The actual components to be offloaded will be selected online using the appropriate scheduling constraints in the second stage; and (ii) a single stage algorithm where all the components are considered for offloading and the offload decisions are made online, based on some scheduling constraints. The offloading strategies for transmission at the mobile and cloud end use past wireless interface data, queue status and the current data flow to update the current queue status. The performance of the proposed algorithm is compared below to different approaches such as (i) no offloading; (ii) complete offloading (all components remotely executed); (iii) the offline dynamic offloading algorithm proposed in D. Huang, P. Wang, and D. Niyato, "A dynamic offloading algorithm for mobile computing," *IEEE Transactions on Wireless Communications*, vol. 11, no. 6, pp. 1991-1995, June 2012, extended to applications with sequential dependency graphs; and (iv) the approach where offloading takes place only via the best link at that time. Note that since the algorithm in preceding D. Huang, P. Wang, and D. Niyato article is an offline strategy specifically for applications with sequential component dependency graphs, we use a special case of the algorithm presented here for comparisons with the work in D. Huang, P. Wang, and D. Niyato article. What follows is a consideration of cloud offloading mechanisms classified based on the granularity and extent of offloading, application partitioning, offline/online scheduling, and use (or not) of multi-RAT technologies.

Classification Based on the Granularity and Extent of Offloading

Computation offloading for mobile networks can be categorized into three groups: (i) all or nothing offloading, where the application is either completely offloaded to a remote cloud or completely executed locally, W. Zhang, Y. Wen, K. Guan, D. Kilper, H. Luo, and D. Wu, "Energy-optimal mobile cloud computing under stochastic wireless channel," *IEEE Transactions on Wireless Communications*, vol. 12, no. 9, pp. 4569-4581, September 2013; (ii) wholesale offloading—where the entire application is eventually offloaded, P. Shu, F. Liu, H. Jin, M. Chen, F. Wen, and Y. Qu, "eTime: Energy-efficient transmission between cloud and mobile devices," in *IEEE Proceedings of INFOCOM*, April 2013, pp. 195-199; Y. Lin, E. Chu, Y. Lai, and T. Huang, "Time-and-energy-aware computation offloading in handheld devices to coprocessors and clouds," *IEEE Systems Journal*, vol. 9, no. 2, pp. 393-405, June 2015 and (iii) those that partition the application into smaller units and make piecewise decisions to either execute the unit locally or to offload it to a remote cloud, S. E. Mahmoodi, K. P. Subbalakshmi, and V. Sagar, "Cloud offloading for multi-radio enabled mobile devices," in *IEEE International Communication Conference (ICC)*, June 2015, pp. 1-6; E. Cuervo, A. Balasubramanian, D. ki Cho, A. Wolman, S. Saroiu, R. Chandra, and P. Bahl, "MAUI: Making smartphones last longer with code offload," in *International Conference on Mobile Systems, Applications, and Services*. ACM, 2010, pp. 49-62; S. Kosta, A. Aucinas, P. Hui, R. Mortier, and X. Zhang, "Thinkair: Dynamic resource allocation and parallel execution in the cloud for mobile code offloading," in *IEEE Proceedings of INFOCOM*, 2012, pp. 945-953; D. Kovachev, T. Yu, and R. Klamma, "Adaptive computation offloading from mobile devices into the cloud," in *IEEE International Symposium on Parallel and Distributed Processing with Applications (ISPA)*, 2012, pp. 784-791; C. Shi, K. Habak, P. Pandurangan, M. Ammar, M. Naik, and E. Zegura, "COSMOS: Computation offloading as a service for mobile devices," in *Proceedings of the ACM International Symposium on Mobile Ad Hoc Networking and Computing*, ser. MobiHoc '14. New York, N.Y., USA: ACM, 2014, pp. 287-296; and S. Barbarossa, S. Sardellitti, and P. D. Lorenzo, "Computation offloading for mobile cloud computing based on wide cross-layer optimization," in *Future Network and Mobile Summit (FutureNetworkSummit)*, July 2013, pp. 1-10. This last category offers the maximum degrees of freedom for this problem, X. Gu, K. Nahrstedt, A. Messer, I. Greenberg, and D. Milojicic, "Adaptive offloading for pervasive computing," *IEEE Pervasive Computing*, vol. 3, no. 3, pp. 66-73, Third quarter 2004; and W. Gao, Y. Li, H. Lu, T. Wang, and C. Liu, "On exploiting dynamic execution patterns for workload offloading in mobile cloud applications," in *IEEE 22nd International Conference on Network Protocols (ICNP)*, October 2014, pp. 1-12; and hence, we use that approach in this disclosure. Within the partial offloading strategies, some schemes have proposed coarse level partitioning of the applications where the code is pre-partitioned into components, S. E. Mahmoodi, K. P. Subbalakshmi, and V. Sagar, "Cloud offloading for multi-radio enabled mobile devices," in *IEEE International Communication Conference (ICC)*, June 2015, pp. 1-6; D. Huang, P. Wang, and D. Niyato, "A dynamic offloading algorithm for mobile computing," *IEEE Transactions on Wireless Communications*, vol. 11, no. 6, pp. 1991-1995, June 2012; S. Barbarossa, S. Sardellitti, and P. D. Lorenzo, "Computation offloading for mobile cloud computing based on wide cross-layer optimization," in *Future Network and Mobile Summit (FutureNetworkSummit)*, July 2013, pp. 1-10; and H. Wu, Q. Wang, and K. Wolter, "Trade-off between performance improvement and energy saving in mobile cloud offloading systems," in *IEEE International Conference on Communications Workshops (ICC)*, June 2013, pp. 728-732. A more fine-grained offloading can be achieved by using method-level partitioning as in MAUI, E. Cuervo, A. Balasubramanian, D. ki Cho, A. Wolman, S. Saroiu, R. Chandra, and P. Bahl, "MAUI: Making smartphones last longer with code offload," in *International Conference on Mobile Systems, Applications, and Services*. ACM, 2010, pp. 49-62. ThinkAir, S. Kosta, A. Aucinas, P. Hui, R. Mortier, and X. Zhang, "Thinkair: Dynamic resource allocation and parallel execution in the cloud for mobile code offloading," in *IEEE Proceedings of INFOCOM*, 2012, pp. 945-953, also provides method-level partitioning but focuses more on scalability issues and parallel execution of offloaded tasks. An Android specific services-based mobile cloud computing middleware called Mobile Augmentation Cloud Services (MACS), D. Kovachev, T. Yu, and R. Klamma, "Adaptive computation offloading from mobile devices into the cloud," in *IEEE International Symposium on Parallel and Distributed Processing with Applications (ISPA)*, 2012, pp. 784-791, allows for seamless offloading of the application to the cloud. The decision for partitioning is cast as an optimization problem using cloud and device parameters, such as CPU load, available memory, remaining device battery power and available spectrum bandwidth. COSMOS C. Shi, K. Habak, P. Pandurangan, M. Ammar, M. Naik, and E. Zegura, "COSMOS: Computation offloading as a service for mobile devices," in *Proceedings of the ACM International Symposium on Mobile Ad Hoc Networking and Computing*, ser. MobiHoc '14. New York, N.Y., USA: ACM, 2014, pp. 287-296, is a fine grained platform where partial computation offloading of sequential tasks is proposed as a service.

Offline/Online Scheduling in Wireless Cloud Offloading

Another way to classify offloading techniques is based on whether the decisions to offload components is done at the beginning (one-shot, also known as offline strategy) or whether these decisions are made on the fly (online strategies), L. A. Hall, A. S. Schulz, D. B. Shmoys, and J. Wein, "Scheduling to minimize average completion time: Off-line and on-line approximation algorithms," 1996. Offline offload strategies that minimize the energy consumed by the mobile device with constraints on the overall application deadline have been considered, e.g., in M. Nir, A. Matrawy, and M. St-Hilaire, "An energy optimizing scheduler for mobile cloud computing environments," in *IEEE Conference on Computer Communications Workshops (INFOCOM)*, April 2014, pp. 404-409, while individual deadline constraints for application tasks are monitored in P. Balakrishnan and C.-K. Tham, "Energy-efficient mapping and scheduling of task interaction graphs for code offloading in mobile cloud computing," in *IEEE/ACM 6th International Conference on Utility and Cloud Computing (UCC)*, December 2013, pp. 34-41. A partial offline offloading policy for the special case of applications with serial dependency graphs (see below for detailed description of component description graphs) is proposed in W. Zhang, Y. Wen, and D. Wu, "Collaborative task execution in mobile cloud computing under a stochastic wireless channel," *IEEE Transactions on Wireless Communications*, vol. 14, no. 1, pp. 81-93, January 2015, and "Energy-efficient scheduling policy for collaborative execution in mobile cloud computing," in *IEEE Proceedings of INFOCOM*, April 2013, pp. 190-194. A partial offloading strategy using a predictive algorithm for wireless connectivity is used in C. Shi, P. Pandurangan, K. Ni, J. Yang, M. Ammar, M. Naik, and E. Zegura, IC-Cloud: Computation offloading to an intermittently-connected cloud," *SCS Technical Report in Georgia Institute of Technology*, 2013. [Online]. Available: http://hdl.handle.net/1853/45985, where a risk control strategy is applied to increase reliability of the prediction. Another work, based on genetic algorithms was proposed in S. Deng, L. Huang, J. Taheri, and A. Zomaya, "Computation offloading for service workflow in mobile cloud computing," *IEEE Transactions on Parallel and Distributed Systems*, vol. PP, no. 99, pp. 1-1, Early access 2015; however, this strategy does not consider multi-RAT enabled devices or the scheduling order of components based on the component dependency graphs.

Online (time adaptive) cloud offloading for mobile devices requires awareness of instantaneous changes in the rates, delay values, and communication power for all of the radio interfaces. A partial computation offloading for frame-based real-time tasks with response time guarantees from the cloud servers is studied in A. S. M. Toma and J.-J. Chen, "Computation offloading for frame-based real-time tasks under given server response time guarantees," *Leibniz Transactions on Embedded Systems*, vol. 1, no. 2, pp. 1-21, November 2014, where the server estimates the response time for remote execution of each task based on total bandwidth server model, M. Spuri and G. Buttazzo, "Scheduling aperiodic tasks in dynamic priority systems," *REAL-TIME SYSTEMS*, vol. 10, pp. 179-210, 1996, and the tasks are scheduled for offloading with an "earliest deadline first" algorithm. An "everything on the cloud" offloading strategy based on energy and delay trade-off is proposed in eTime, P. Shu, F. Liu, H. Jin, M. Chen, F. Wen, and Y. Qu, "eTime: Energy-efficient transmission between cloud and mobile devices," in *IEEE Proceedings of INFOCOM*, April 2013, pp. 195-199. Although, this work does assume a multi-RAT device only the best single wireless interface is used for offloading.

Wireless Cloud Offloading Using Single/Multiple Radio Interface(s)

The third type of classification is based on whether the offloading algorithms are developed for single- or multi-RAT devices, and if multi-RAT devices are used, whether the wireless interfaces are used in a hybrid mode or an On/Off mode.

Wireless Cloud Offloading for Single-RAT Devices:

A multi-channel partial offline offloading solution for single-RAT enabled mobile devices was proposed in S. Barbarossa, S. Sardellitti, and P. D. Lorenzo, "Computation offloading for mobile cloud computing based on wide cross-layer optimization," in *Future Network and Mobile Summit (FutureNetworkSummit)*, July 2013, pp. 1-10. Note that the multi-RAT scenario is significantly different from the multi-channel single-RAT, in that the parameters of the different networks (e.g. WiFi and LTE) supported by multi-RAT devices vary widely in comparison to the parameters of different channels of the same radio interface, K. Ramachandran, E. Belding, K. Almeroth, and M. Buddhikot, "Interference-aware channel assignment in multi-radio wireless mesh networks," in *IEEE Conference on Computer Communications (INFOCOM)*, 2006, pp. 1-12. The extension of S. Barbarossa, S. Sardellitti, and P. D. Lorenzo, "Computation offloading for mobile cloud computing based on wide cross-layer optimization," in *Future Network and Mobile Summit (FutureNetworkSummit)*, July 2013, pp. 1-10 (with predetermined call graphs) to joint allocation of transmit power and OFDM constellation size in single and multi-channel cases in single-RAT enabled devices is studied in S. S. Paolo Di Lorenzo, Sergio Barbarossa, "Joint optimization of radio resources and code partitioning in mobile cloud computing," *IEEE Transactions on Parallel and Distributed Systems*, pp. 1-1, Under second round of review 2015. Other work on single-RAT wireless offloading include: X. Ma, Y. Zhao, L. Zhang, H. Wang, and L. Peng, "When mobile terminals meet the cloud: computation offloading as the bridge," *IEEE Network*, vol. 27, no. 5, pp. 28-33, September 2013; W. Zhang, Y. Wen, K. Guan, D. Kilper, H. Luo, and D. Wu, "Energy-optimal mobile cloud computing under stochastic wireless channel," *IEEE Transactions on Wireless Communications*, vol. 12, no. 9, pp. 4569-4581, September 2013; E. Cuervo, A. Balasubramanian, D. ki Cho, A. Wolman, S. Saroiu, R. Chandra, and P. Bahl, "MAUI: Making smartphones last longer with code offload," in *International Conference on Mobile Systems, Applications, and Services*. ACM, 2010, pp. 49-62; S. Kosta, A. Aucinas, P. Hui, R. Mortier, and X. Zhang, "Thinkair: Dynamic resource allocation and parallel execution in the cloud for mobile code offloading," in *IEEE Proceedings of INFOCOM*, 2012, pp. 945-953; D. Kovachev, T. Yu, and R. Klamma, "Adaptive computation offloading from mobile devices into the cloud," in *IEEE International Symposium on Parallel and Distributed Processing with Applications (ISPA)*, 2012, pp. 784-791; C. Shi, K. Habak, P. Pandurangan, M. Ammar, M. Naik, and E. Zegura, "COSMOS: Computation offloading as a service for mobile devices," in *Proceedings of the ACM International Symposium on Mobile Ad Hoc Networking and Computing*, ser. MobiHoc '14. New York, N.Y., USA: ACM, 2014, pp. 287-296; M. Nir, A. Matrawy, and M. St-Hilaire, "An energy optimizing scheduler for mobile cloud computing environments," in *IEEE Conference on Computer Communications Workshops (INFOCOM)*, April 2014, pp. 404-409; P. Balakrishnan and C.-K. Tham, "Energy-efficient mapping and scheduling of task interaction graphs for code offloading in mobile cloud computing," in *IEEE/ACM 6th International Conference on Utility and Cloud Computing (UCC)*, December 2013, pp. 34-41; "Energy-efficient scheduling policy for collaborative execution in mobile cloud computing," in *IEEE Proceedings of INFOCOM*, April 2013, pp. 190-194; C. Shi, P. Pandurangan, K. Ni, J. Yang, M. Ammar, M. Naik, and E. Zegura, "IC-Cloud: Computation offloading to an intermittently-connected cloud," *SCS Technical Report in Georgia Institute of Technology*, 2013. [Online]. Available: http://hdl.handle.net/1853/45985; S. Deng, L. Huang, J. Taheri, and A. Zomaya, "Computation offloading for service workflow in mobile cloud computing," *IEEE Transactions on Parallel and Distributed Systems*, vol. PP, no. 99, pp. 1-1, Early access 2015; A. S. M. Toma and J.-J. Chen, "Computation offloading for frame-based real-time tasks under given server response time guarantees," *Leibniz Transactions on Embedded Systems*, vol. 1, no. 2, pp. 1-21, November 2014; Y. Wen, W. Zhang, and H. Luo, "Energy-optimal mobile application execution: Taming resource-poor mobile devices with cloud clones," in *IEEE Proceedings of INFOCOM*, 2012, pp. 2716-2720; and S. E. Mahmoodi, R. N. Uma, and K. P. Subbalakshmi, "Optimal joint scheduling and cloud offloading for mobile applications," in *Submitted to IEEE Transactions on Cloud Computing special issue on Mobile Clouds*, June 2015. Recently, we proposed the concept of joint scheduling-offloading in the preceding S. E. Mahmoodi, R. N. Uma, and K. P. Subbalakshmi article, where the scheduling order of execution for the components, as well as, where each component must be executed, is jointly determined. This is in contrast to assuming a compiler pre-determined scheduling order and allows the algorithm to pick an optimal order of execution, appropriate for the wireless network conditions. This algorithm was designed for single-RAT mobile devices and is an offline solution.

Wireless Cloud Offloading for Multi-RAT Devices:

Cloud offloading strategies for multi-RAT devices, S. E. Mahmoodi, K. P. Subbalakshmi, and V. Sagar, "Cloud offloading for multi-radio enabled mobile devices," in *IEEE International Communication Conference (ICC)*, June 2015, pp. 1-6; D. Huang, P. Wang, and D. Niyato, "A dynamic offloading algorithm for mobile computing," IEEE Transactions on Wireless Communications, vol. 11, no. 6, pp. 1991-1995, June 2012; and P. Shu, F. Liu, H. Jin, M. Chen, F. Wen, and Y. Qu, "eTime: Energy-efficient transmission between cloud and mobile devices," in *IEEE Proceedings of*

*INFOCOM*, April 2013, pp. 195-199, have recently begun to gain interest in the community because of the advances in cognitive radio networking M. Zorzi, A. Zanella, A. Testolin, M. D. F. D. Grazia, and M. Zorzi, "Cognition-based networks: A new perspective on network optimization using learning and distributed intelligence," *IEEE Access*, vol. 3, pp. 1512-1530, August 2015, and heterogeneous networks (HetNets) as well as the trend in 4G to 5G evolution. However, most of these works, e.g., D. Huang, P. Wang, and D. Niyato, "A dynamic offloading algorithm for mobile computing," *IEEE Transactions on Wireless Communications*, vol. 11, no. 6, pp. 1991-1995, June 2012, and P. Shu, F. Liu, H. Jin, M. Chen, F. Wen, and Y. Qu, "eTime: Energy-efficient transmission between cloud and mobile devices," in *IEEE Proceedings of INFOCOM*, April 2013, pp. 195-199, only use one of the wireless interfaces (the one with the best characteristics) for all offloading related data transfers. Hence, these algorithms basically work with an On-Off model for the wireless interfaces. We proposed the first cognitive offloading strategy for multi-RAT devices, where all viable wireless interfaces are simultaneously used to offload as well as the optimal percentage of data over each wireless interface in S. E. Mahmoodi, K. P. Subbalakshmi, and V. Sagar, "Cloud offloading for multi-radio enabled mobile devices," in *IEEE International Communication Conference (ICC)*, June 2015, pp. 1-6. While this prior work was a one-shot (offline) offloading strategy, this disclosure discusses an online (time adaptive) strategy for cognitive offloading. Moreover, in the prior work, we optimized over all available interfaces at the mobile transmitter end only, and not at the cloud transmitter end. In this disclosure we present an online (time adaptive) cognitive mobile offloading strategy for both transmission and reception of relevant data. Finally, in our prior work, we assumed that the applications had either serial component dependency graphs or that we use a pre-determined scheduling order for the components of the application, whereas the present disclosure proposes a joint scheduling-offloading strategy for applications with arbitrary CDGs. The present disclosure presents an online (time adaptive) joint scheduling and cognitive offloading for multi-RAT devices for applications with arbitrary dependency graphs. The heuristic scheme in this disclosure differs from other approaches in at least the following aspects: (i) it is a true cognitive offloading strategy for multi-RAT devices; (ii) it is a time-adaptive online offloading strategy for applications with general component dependencies and therefore (iii) it is the first joint scheduling-cognitive offloading scheme for multi-RAT devices.

Network and Application Model

FIG. 1 shows a system 10 with a mobile device 12 with K radio interfaces 14, 16, 18, 20, 22, 24 in a wireless network 26 including a server computer 28 (server), the system 10 running a mobile application 30 having N-components 30C. In one embodiment, the application 30 may be resident in its entirety on the mobile device 12, such that the application can be executed using the input devices, e.g., touch screen, keyboard, microphone, camera, accelerometer, etc., the microprocessor and memory of the mobile device 12. In another embodiment, the application program may reside wholly or partially on the server computer 28, such that the processing of the application 30 can be partly or completely performed on the server computer 28, assuming the receipt of the necessary data, which may be supplied by the mobile device 12 via wireless communication and stored on the server computer 28 for processing. In another embodiment, application components 30C may be transmitted like data between the server computer 28 and the mobile device 12 for execution on the recipient of the application component(s) 30C. A cognitive offloader and cloud scheduler 32 resides on the server computer 30 and coordinates the execution of the application 30 by assigning processing tasks/components 30C to the mobile device and/or the server computer and controlling the flow of data required for execution of the components 30C over the radio interfaces 14-24, as described further below. In one embodiment, the application 30 is pre-analyzed to identify executable components 30C such that a component dependency graph 34 can be generated allowing the cognitive offloader and cloud scheduler to operate. From the perspective of the mobile device 12, the server computer 28 in the network 26 is referred to as being, "in the cloud" 26C, i.e., a remote part of the network 26 to which the mobile device 12 is wirelessly connected. The goal of the cognitive offloader and cloud scheduler 32 algorithm is to find a time adaptive scheduling-offloading policy for all components 30C, as well as, the optimal wireless resource allocation between the multi-RAT interfaces 14-24 for data transfers of both the mobile to cloud and the cloud to mobile. In the model in FIG. 1, at time slot t $\forall$t, $\alpha_k$ (t) % of the required data for offloading is sent by the mobile device through radio interface k $\forall$k. Similarly, $\beta_k$ (t) % of the data is sent by the cloud end using radio interface k $\forall$k. Both $\alpha_k(t)$ and $\beta_k(t)$ are computed to achieve optimum net utility.

Component Dependency Graph

Figure 2A:
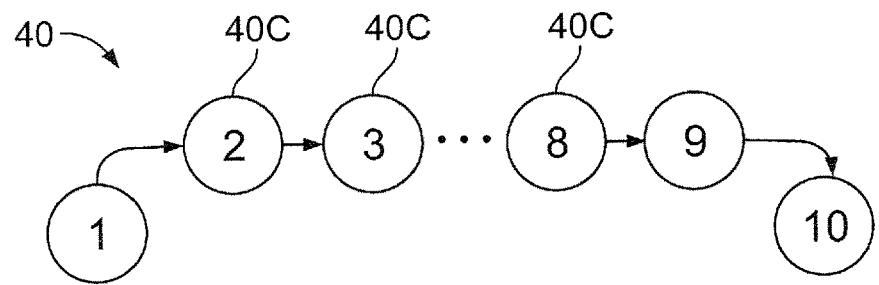
FIG. 2A is a serial component dependency graph for an exemplary mobile application (app) where the number of components, N=10.
Figure 2B:
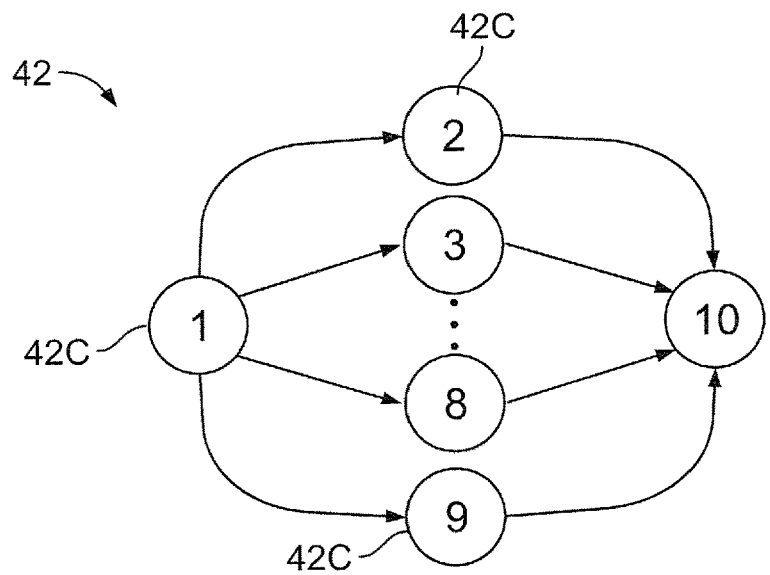
FIG. 2B is a parallel component dependency graph for an exemplary mobile application where the number of components, N=10.
Figure 2C:
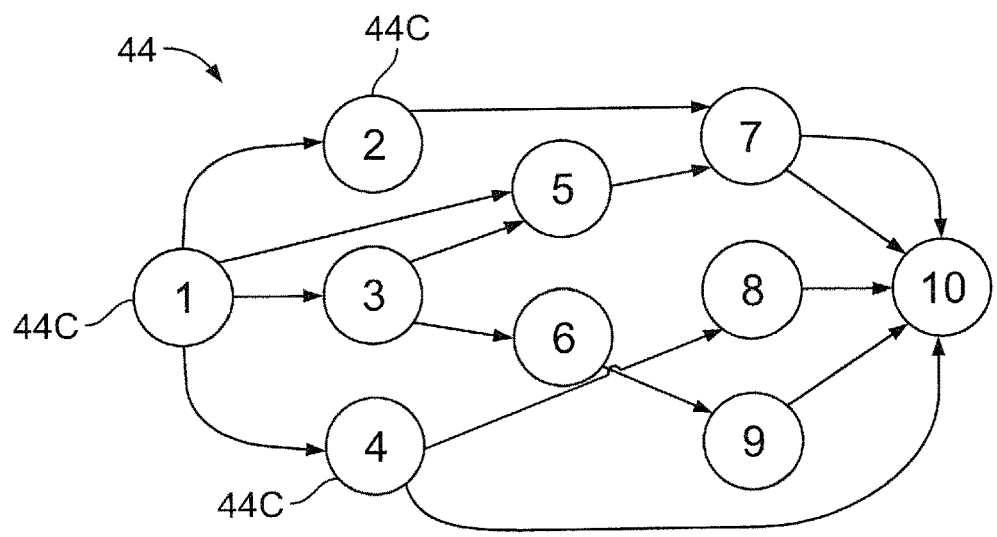
FIG. 2C is a general component dependency graph for an exemplary mobile application where the number of components, N=10.

As mentioned above, mobile applications 30 can be partitioned into components 30C, D. Kovachev, T. Yu, and R. Klamma, "Adaptive computation offloading from mobile devices into the cloud," in *IEEE International Symposium on Parallel and Distributed Processing with Applications (ISPA)*, 2012, pp. 784-791; G. Chen, B.-T. Kang, M. Kandemir, N. Vijaykrishnan, M. Irwin, and R. Chandramouli, "Studying energy trade-offs in offloading computation/compilation in java-enabled mobile devices," *IEEE Transactions on Parallel and Distributed Systems*, vol. 15, no. 9, pp. 795-809, September 2004; and H. T. Dinh, C. Lee, D. Niyato, and P. Wang, "A survey of mobile cloud computing: architecture, applications, and approaches," *Wireless Communications and Mobile Computing*, vol. 13, no. 18, pp. 1587-1611, 2013. Component i is said to be dependent on component j, if data must be sent from j (after j completes execution) to i, in order for i to complete its execution. This dependency is usually depicted as a component dependency graph (CDG) 34. CDGs can be: (i) serial (FIG. 2A shows a serial dependency graph 40 where one component 40C depends only on the output of one other component 40C); (ii) parallel (FIG. 2B shows a parallel dependency graph 42 where all components 42C depend on only the first component 42C and the last component 42C depends on the rest); and (iii) general (FIG. 2C shows a general dependency graph 44 which can be any combination of serial and parallel dependent components 44C). In each of FIGS. 2A-C the number of components 40C, 42C, 44C is ten, i.e., N=10. Here, the nodes represent components and directed links show dependency between the components. An example of a general CDG 46 for a video navigation application with N=14 components 46C is shown in FIG. 3A. In this video navigation application, graphics library tools are used from the OpenGL mobile Android applications, March 2014. [Online]. Available: http://www.opengl.org/., face detection is used from July 2014. [Online]. Available: http://wvvw.developer.com/ws/android/programming/face-detection-with-android-apis.html., and all of the video processing features are obtained from April 2014. [Online]. Available: http://opencv.org/. The time adaptive cognitive cloud offloading strategy of the present disclosure will schedule each component to process either in the cloud or in the mobile, while keeping these dependencies in mind, along with other constraints. The decision to offload or locally execute a component will be made adaptive to current wireless conditions. Since most applications are user initiated, the first (potentially involving some input from the human user) and last (potentially involving some displayed output) components are typically scheduled on the mobile device. FIG. 3B shows an example of the stages of processing for the application with the CDG 46 shown in FIG. 3A at the first five time slots $t_0$-$t_4$. More details of the algorithm are described below. We can see that some components (e.g. components 2, 6, and 11 in the cloud and 4 in the mobile for this example) can be scheduled for parallel execution.

A smart cognitive cloud offloading algorithm will trade-off the benefits of wireless offloading, namely, energy and time savings (when components can be parallely scheduled in the cloud and the mobile) with the costs of offloading, namely, the energy and delay costs involved in the associated data transfer, while simultaneously deciding on the optimal percentage of the data to send from the mobile and the cloud via each of the available wireless network interfaces 14-24. We assume that the energy consumption and the time required to transfer data between components that are executed in the same entity (whether cloud or mobile) is negligible in comparison to when the data must be transferred between entities. Also, we assume that the cloud and the mobile clocks are synchronized, B.-G. Chun and P. Maniatis, "Augmented smartphone applications through clone cloud execution," in *Proceedings of the 12th Conference on Hot Topics in Operating Systems*, ser. HotOS'09, 2009, pp. 8-8 and J. Liu, B. Priyantha, T. Hart, H. S. Ramos, A. A. F. Loureiro, and Q. Wang, "Energy efficient gps sensing with cloud offloading," in *Proceedings of the ACM Conference on Embedded Network Sensor Systems*, ser. SenSys '12, 2012. The time adaptive scheduling—offloading heuristic is managed in the cloud, and the feedback of decisions on offloading the components will be sent to the mobile device (FIG. 1). In the online stage for offloading at each time slot, two sub-strategies are studied for cloud offloading: (i) mobile to cloud transmission strategy that trades-off the energy consumption by the mobile for transmission, the delay for transferring the required data from mobile to the cloud, and queue stability of the mobile Tx (transmit) buffers 14B, 16B, 18B for all the radio interfaces 14, 16, 18; and (ii) cloud to mobile transmission strategy that trades-off the energy consumption by the mobile for reception, the delay for transferring the required data from cloud to the mobile, and queue stability of the cloud Tx buffers 20B, 22B, 24B for all the radio interfaces 20, 22, 24, which reflects the connectivity with the mobile receiver.

Net Utility Function

To determine the best strategy for joint scheduling-offloading, an aspect of the present disclosure is to define an appropriate net utility function. The notations used for these terms and the other parameters in this disclosure are defined in Table I below.

TABLE 1

| Parameters | Definitions |
| --- | --- |
| N | number of components in the application. |
| K | number of wireless radio interfaces. |
| T | number of time slots to complete processing the application. |
| x | span of each time slot. |
| $M_i$ | memory consumed by the mobile device to launch component i. |
| $code_i$ | code size to launch component i. |
| $\varepsilon$ | mapping factor to relate code size and the CPU instructions [43]. |
| $w_x$ | weight factor of function x. |
| $P_i^m$ | power consumed by the mobile device when it is actively processing component i. |
| $P_k^{Tx}(t)$ ($P_k^{Rx}(t)$) | transmit (received) power consumed by the mobile device through radio interface k at time slot t. |
| $q_i^m$ ($q_i^c$) | number of time slots to process component i in the mobile (cloud). |
| $\gamma$ | weight factor (to adjust the wait time for offloading). |
| $A_k^{mc}(t)$ ($A_k^{cm}(t)$) | data rate transmitted from the mobile (cloud) to the cloud (mobile) through radio interface k at time slot t. |
| $B_i^{mc}(t)$ ($B_i^{cm}(t)$) | arrival data rate at the mobile (cloud), including the ambient traffic as well as the data generated by offloaded component i (arrival data in time slot t). |
| $\mu_{ij}$ | dependency indicator: 1 if component i must be processed before j and 0 otherwise. |
| $Q_k(t)$ ($S_k(t)$) | the transmission queue of data from the mobile (cloud) side for wireless interface k at time slot t. |
| $I_i(t)$ | offloading indicator: 1 if the mobile starts to offload component i at time slot t. |
| $c_i(t)$ | indicator function that takes on a value of 1, if the component i has started execution in the cloud at any time between 1 and t. |
| $X_i(t)$ | local execution indicator: 1 if the mobile starts to execute component i locally at time slot t. |
| $m_i(t)$ | indicator function that takes on a value of 1, if the component i has started local execution at any time slot between 1 and t. |
| $z_{ij}(t)$ | indicator for communication requirement: 1 if component i is executed in the mobile and j is offloaded to the cloud by time slot t. |
| $\alpha_k(t)$ | percentage of allocated uplink (mobile to cloud) rate using radio interface k for communication at t. |
| $\beta_k(t)$ | percentage of allocated downlink (cloud to mobile) rate using radio interface k for communication at t. |
| $E_{com}^{Tx}(t)$ ($E_{com}^{Tx}(t)$) | Energy consumed for the mobile transmission (reception) due to cloud offloading. |
| $\tau_{i,k}^{mc}(t)$ ($\tau_{i,k}^{cm}(t)$) | delay (in number of time slots) to transmit the output data from component i in the mobile (cloud) to the cloud (mobile) at interface k starting by t. |
| $U(t)$ | net utility function at time t. |

TABLE 1-continued

| Parameters | Definitions |
| --- | --- |
| $C_{com}(t_0)$ | lower bound approximation of the communication cost for component dependencies in the offline stage. |
| $T_{th}^{Tx}$ ($T_{th}^{Tx}$) | threshold number of time slots for transmission from mobile (cloud) to cloud (mobile). |
| $l_{ji}(t)$ | the time slots to process the preceding component j, and transfer the output data from component j to i by t. |
| $\Omega_{mc}(t)$ ($\Omega_{cm}(t)$) | the objective function for mobile (cloud) transmission strategy at time t. |
| $V_{mc}$ ($V_{cm}$) | control parameter in mobile (cloud) transmission for Lyapunov optimization. |

To determine the scheduling-offloading strategy for component i, two decision variables are defined for a time slot t as follows:

$$I_i(t) \equiv \begin{cases} 1 & \text{component } i \text{ starts offloading at } t, \\ 0 & \text{otherwise}, \end{cases}$$

$$X_i(t) \equiv \begin{cases} 1 & \text{component } i \text{ starts executing locally at } t, \\ 0 & \text{otherwise}. \end{cases}$$

The net utility is calculated as a weighted sum of the energy, memory, and CPU cycles saved for the mobile device minus the inter-component communication cost arising from executing some components locally and some remotely. This can be written as:

$$U(t) = w_{saved} E_{saved}(t) + w_{memory} M_{saved}(t) + w_{CPU} CPU_{saved}(t) - w_{com} C_{com}(t). \quad (1)$$

The weights for the individual costs and benefits are chosen such that $w_{saved} = 1 - w_{com}$, and $w_{CPU} = 1 - w_{memory}$.

At any given time t, the total energy saved by executing the components in the cloud can be computed as the energy cost for running it locally ($P_i^m q_i^m$), which is given by:

$$E_{saved}(t) = \sum_{i=1}^{N} c_i(t) P_i^m q_i^m,$$

where $$c_i(t) = \sum_{s=1}^{t} I_i(s)$$

and s=1 corresponds to the first time slot, when component i begins to execute. Likewise, $$m_i(t) = \sum_{s=1}^{t} X_i(s)$$

where s runs from the first time slot to the time slot corresponding to the current time t. The memory saved in the mobile device by offloading the components to the cloud can be expressed as:

$$M_{saved}(t) = \sum_{i=1}^{N} c_i(t) M_i,$$

where $M_i$ is the memory consumed by the mobile device to launch component i.

The objective function for CPU cycles saved is given by:

$$CPU_{saved}(t) = \sum_{i=1}^{N} c_i(t)(\varepsilon \times code_i),$$

where $code_i$ is the size of the code for instructions that is used for executing component i and $\varepsilon$ is the mapping between code size and the CPU instructions. The communication cost at time slot t ($C_{com}(t)$) will be discussed in the next section.

Proposed Cognitive Offloading & Scheduling Heuristic

In this section, we propose a heuristic to find an online cognitive scheduling-offloading strategy for the computations of mobile applications. The objective of the strategy is to specify the components that are selected for computation offloading, the time that each component should be scheduled for execution either locally or remotely, and the radio interface allocation for offloading at each time slot for both the mobile and cloud data transmission. The complete algorithm is depicted in Algorithm 1. A detailed description of the algorithm follows:

Optional Offline Stage

As mentioned above, the offloading problem can be formulated as a two-stage or single-stage algorithm. This section discusses the first stage of the two-stage algorithm. In this stage, we eliminate some of the components as unsuitable for offloading at the outset, maximizing the instantaneous utility values at time to (e.g. components 5 and 7 in FIG. 3b). Thus, this stage provides a suboptimal solution for the heuristic algorithm. This stage can be omitted, and all the components can be considered for potential offloading in case a single-stage version of the algorithm is preferred. Note that the single-stage algorithm adds more time complexity to the online stage of the algorithm as compared to the two-stage algorithm, but is closer to the optimal solution.

In the offline stage, we identify the components that contribute the most to an increase in the net utility if scheduled in the mobile device and then eliminate them from being considered for offloading. We first obtain an approximate value for the optimal solution based on the information available at time $t_0$. To do this we maximize the instantaneous net utility given by Eqn (1) using an approximation for the energy cost of offloading corresponding to time $t_0$ ($C_{com}(t_0)$) assuming that the interface with the lowest communication power levels is used for data transfer. Mathematically, $$\hat{C}_{com} = w_{com} \left\{ \sum_{i=1}^{N} \sum_{j=1}^{N} \mu_{ij} m_i(t_0) c_j(t_0) \min_k (P_k^{Tx}(t_0) \tau_{th}^{mc}) + \right. \quad (2)$$

$$\mu_{ij}c_i(t_0)m_j(t_0)\min_k(P_k^{Rx}(t_0)\tau_{th}^{cm})\bigg\},$$

where $\mu_{ij}$ represents the dependency indicator (1 if component i must be processed before j, and 0 otherwise), and $\tau_{th}^{mc}$ and $\tau_{th}^{cm}$ are threshold values for the transmission at the mobile and cloud ends for each component, respectively. To obtain the approximation given by Eqn (2), we assume that the Tx (transmit) and Rx (receive) power levels ($P_k^{Tx}(t_0)$ and $P_k^{Rx}(t_0)$) are fixed when computing these values for the offline stage. By selecting the wireless interface with the lowest Tx and Rx energy levels, we obtain the minimum energy consumed for communication over the wireless interfaces ($\forall k=1, 2, \ldots, K$) in Eqn (2) with the initial information in the offline stage (i.e., in the transmission, we have:

$$\min_k(P_k^{Tx}(t_0)\tau_{th}^{mc}).$$

The optimization problem in the offline stage can be written as:

$$OP_{off}: \max_c w_{saved}E_{saved}(t_0) + \tag{3}$$
$$w_{memory}M_{saved}(t_0) + w_{CPU}CPU_{saved}(t_0) - \hat{C}_{com}(t_0),$$
s.t.

$$\sum_{i=1}^{N} m_i(t_0)q_i^m + \sum_{i=1}^{N} c_i(t_0)q_i^c + \tag{4}$$
$$\sum_{i=1}^{N}\sum_{j=1}^{N} \mu_{ij}(m_i(t_0)c_j(t_0)\tau_{th}^{mc} + \mu_{ij}c_i(t_0)m_j(t_0)\tau_{th}^{cm}) \leq T,$$

where c is the offload indicator vector (c=[c1(t0) c2(t0) . . . cN (t0)]), and T is the number of time slots to complete processing the application. Since the energy consumed by local execution ($P_i^m q_i^m$), local memory consumption (Mi), and local CPU consumption ($\varepsilon$codei) are constant parameters, calculating the lower bound of the communication cost in Eqn (2) at initial time slot t0 by $\hat{C}com(t0)$ gives the upper bound of the net utility approximation considering all the potential components for offloading in the online stage. By solving this optimization problem, $C_i^*(t_0)$ $\forall i$ is obtained which specifies if the component i must be offloaded ($C_i(t_0)=1$) or not. If $C_i(t_0)=1$ (equivalently, $m_i(t_0)=1-c_i(t_0)=0$), then component i will be processed in the online stage (components 2, 3, 4, 6, 8, 9, 10, 11, and 12 in FIG. 3B). Otherwise, it will be scheduled for local execution based on the precedence constraints dictated by the component dependency graph for the application.

In $OP_{off}$, we have the terms $m_i(t_0)c_j(t_0)$ $\forall i,j$ in the cost function ($\hat{C}_{com}(t_0)$), which makes the optimization problem nonlinear. To convert this to a linear optimization problem, we replace the terms $m_i(t_0)c_j(t_0)$, $\forall i, j$, with a new variable $z_{ij}(t_0)$ and add new constraints to make the new optimization problem equivalent to the original one, as in P. Rubin, September 2014. [Online]. Available: http://orinanobworld.blogspot.de/2010/10/binary-variables-and-quadratic-terms.html.

These constraints are as follows:

$$z_{ij}(t_0) \leq m_i(t_0),\; z_{ij}(t_0) \geq 0,\; z_{ij}(t_0) \leq c_j(t_0),\; z_{ij}(t_0) \geq c_j(t_0) - (1-m_i(t_0)), \tag{5}$$

where $z_{ij}(t_0)$ is the indicator specified at time $t_0$. This indicator is one if component i will be executed in the mobile device and component j will be executed in the cloud; otherwise, it is 0. The following subsections describe the online stage of the proposed heuristic.

Online Stage

In the online stage of the algorithm (starting from $t_1$ in FIG. 3B), the following precedence constraints must be checked to see if a component is eligible for execution at the current time slot t:

1) Each component must be processed only once, either in the mobile or in the cloud. This constraint is mathematically written as:

$$m_i(t-1)+c_i(t-1)<1, \forall i. \tag{6}$$

This equation shows that component i has not started execution (either locally or remotely) by t.

2) All the components on which component i depends should have completed execution before starting the offload process or local execution of component i, that is j precedence symbol i, for all components j that must be completed before component i. This should be checked from the start of the application runtime until $(t-1)^{th}$ time slot. Therefore, the precedence constraints are:

$$m_i(t-l_{ji}(t-1))+c_i(t-l_{ji}(t-1)) \leq m_j(t-1)+c_j(t-1),$$
$$\forall j \prec i, m_j(t-1)+c_j(t-1)=1,\; t=l_{ji}(t-1)+1 \ldots T. \tag{7}$$

where $l_{ji}(t)$ is the number of time slots to process the preceding component j, either locally or remotely, and transfer the output data from component j to i by time slot t. Note that this time duration $l_{ji}(t)$ is a function of t, because the time taken to execute a component and to communicate relevant data are time dependent (because of varying mobile device resource availability and wireless data rates). The duration $l_{ji}(t)$ is expressed as:

$$l_{ji}(t) = m_j(t)q_j^m + c_j(t)q_j^c + \sum_{s=1}^{t}\sum_{k=1}^{K}(z_{ji}\alpha_k(s)\tau_{j,k}^{mc}(s) + z_{ij}\beta_k(s)\tau_{j,k}^{cm}(s)), \tag{8}$$

where $\alpha_k(s)$ and $\beta_k(s)$ are the percentages of allocated rates for the mobile to the cloud and the cloud to the mobile, respectively, using radio interface k for offloading at time slot s. The first two terms on the RHS of Eqn (8) are the execution time slots for component j in the mobile device and cloud, respectively, weighted by the respective indicator functions ($m_j(t)$ and $c_j(t)$). The third term represents the relevant data-offload time between components j and i. If $z_{ji}\alpha_k(s)$ is non-zero, then $\alpha_k(s)\tau_{j,k}^{mc}(s)$ represents the time slots to transmit the allocated output data of component j in the mobile device using radio interface k, to the cloud where component i will be executed at time slot s. If $z_{ij}\beta_k(s)$ is non-zero, then $\beta_k(s)\tau_{j,k}^{cm}(s)$ represents the time slots to send the part of the output data from component j in the cloud via radio interface k to the mobile device where component i will be executed at time slot s.

If these two constraints are satisfied for component i, then it is safe to execute it. Otherwise, component i is not ready for execution at this current time slot, and $X_i(t)$ and $I_i(t)$ are set to 0. Also note that it is possible to calculate $l_{ji}(t-1)$, because we have access to all the decision variables, such as $\alpha_k(s)$, $\beta_k(s)$, $X_i(s)$, and $I_i(s)$, for the previous time slots for $s \in \{1, 2, \ldots, t-1\}$.

Mobile Transmission Strategy:

Once a component has been identified for offloading, then radio allocation for the transmission from the mobile to cloud must be computed. Since our cognitive cloud offloader works with multiple wireless interfaces at the same time, the stability of the data transmission buffers should be monitored to ensure no buffer overflows. Mathematically, this can be written as follows:

$$\overline{Q} = \lim_{T \to \infty} \sup \frac{1}{T} \sum_{t=1}^{T} \sum_{k=1}^{K} E\{|Q_k(t)|\} < \infty$$

where $Q_k(t)$ is the transmission queue of wireless interface k at time slot t from the mobile side. We cast the above problem as a Lyapunov optimization problem see M. J. Neely, *Stochastic Network Optimization with Application to Communication and Queueing Systems* Morgan and Claypool Publishers, 2010. The Lyapunov function is defined as where $$L(Q(t)) = \frac{1}{2} \sum_{k=1}^{K} Q_k^2(t)$$

$Q(t) = [Q_1(t)\ Q_2(t)\ \ldots\ Q_K(t)]$. While the queue of mobile transmission (which includes all data that must be transferred from the mobile device to the cloud) is updated with time, the Lyapunov drift will be $\Delta_{mc}(Q(t)) \triangleq E\{L(Q(t+1)) - L(Q(t))|Q(t)\}$. The Lyapunov drift is opportunistically minimized, taking into account the cost of the energy consumed for mobile transmission: $\Delta_{mc}(Q(t)) + V_{mc}E\{E_{com}^{Tx}(t)|Q(t)\}$ see L. Georgiadis, M. J. Neely, and L. Tassiulas, "Resource allocation and cross-layer control in wireless networks," *Found. Trends Netw.*, vol. 1, no. 1, pp. 1-144, April 2006, where $V_{mc}$ is the control parameter for the queuing of the mobile transmission, considering the balance between the Lyapunov drift and the cost of energy consumed for transmission ($E_{com}^{Tx}(t)$), and $$E_{com}^{Tx}(t) = \sum_{k=1}^{K} P_k^{Tx} \sum_{i=1}^{N} I_i(t) \alpha_k(t) \tau_{i,k}^{mc}(t),$$

where all the components i, prepared for offloading at time slot t have $I_i(t)$ set to one.

Lemma 1:

As proved in M. J. Neely, *Stochastic Network Optimization with Application to Communication and Queueing Systems* Morgan and Claypool Publishers, 2010, the upper bound of the Lyapunov drift is obtained by:

$$\Delta_{mc}(Q(t)) + V_{mc}E[E_{com}^{Tx}(t)|Q(t)] \leq \frac{(A_{max}^{mc})^2}{2} + \quad (9)$$

$$V_{mc}E\left\{E_{com}^{Tx}(t)\mid Q(t)\right\} + \sum_{k=1}^{K} E\left\{Q_k(t)\left(\sum_{i=1}^{N} B_i^{mc}(t) - A_k^{mc}(t)\right)\mid Q(t)\right\}$$

Where $A_k^{mc}(t)$ represents data rate transmitted from the mobile device to the cloud through radio interface k at time slot t, $B_i^{mc}(t)$ is the arrival data rate in the mobile transmission buffer at time slot t. Note that $B_i^{mc}(t)$ will include both the data that the application needs to transfer due to offload operations of component I, as well as, other ambient data that the mobile generates and which is unrelated to the offloading. Also, $A_{max}^{cm}$ is the maximum transmitted data rate.

Following the Lyapunov optimization framework, the upper bound of the objective function in Eqn (10) must be minimized. This can be done by simplifying the RHS of Eqn (10) as follows:

$$OP_{Tx}: \max_{\alpha} \Omega_{mc}(t) = V_{mc}E_{com}^{Tx} - \sum_{k=1}^{K}(Q_k(t)A_k^{mc}(t)), \text{ s.t.} \quad (10)$$

$$\sum_{k=1}^{K} \alpha_k(t) \sum_{i=1}^{N} I_i(t)\tau_{i,k}^{mc}(t) \leq T_{th}^{Tx}, \quad (11)$$

$$\sum_{k=1}^{K} \alpha_k(t) = 1, \quad \alpha_k(t) \geq 0, \forall k, \quad (12)$$

where $\alpha = [\alpha_1(t)\ \alpha_2(t)\ \ldots\ \alpha_K(t)]$. Constraints (11) and (12), respectively, ensure that the transmission time lies below a certain threshold, $T_{th}^{Tx}$, and that the required data is transferred through multi-RATS, but the summation of weights for radio interface allocation should be one.

The performance bounds of the transmission strategy based on the Lyapunov optimization, see M. J. Neely, *Stochastic Network Optimization with Application to Communication and Queueing Systems* Morgan and Claypool Publishers, 2010.

$$\lim_{T \to \infty} \frac{1}{T} \sum_{t=1}^{T} \sum_{k=1}^{K} \overline{Q}_i(t) \leq \frac{\frac{(A_{max}^{mc})^2}{2} + V_{mc}E_{com}^{*Tx}}{\varepsilon_{max}}, \quad (13)$$

$$\lim_{T \to \infty} \frac{1}{T} \sum_{t=1}^{T} \overline{E}_{com}^{Tx}(t) \leq \frac{(A_{max}^{mc})^2}{2V_{mc}} + E_{com}^{*Tx}, \quad (14)$$

where $\overline{a}$ represents the mean value for parameter a, and $E_{com}^{*Tx}$ is the obtained from optimal value of $E_{com}^{Tx}$ obtained from solving the optimization problem in Eqn (10). The offloading strategy (from the mobile to the cloud) in the online stage is as follows. For every component i, qualified for processing from the previous step, if the optimization problem $OP_{Tx}$ has a solution for the variable parameter set $\alpha$ in the feasible region, then component i is offloaded starting at time slot t ($I_i(t)=1$) via K wireless interfaces at the optimal percentage values $\alpha_k^*(t)\ \forall k$ (e.g. component 2 at time $t_2$, component 6 and 11 at $t_3$ in the example of FIG. 3B). If the optimization problem does not have a feasible solution, then we have two options: (i) wait for the next time slot (e.g. components 6 and 11 wait at time $t_2$ in FIG. 3B); (ii) execute the component locally. The difference between the current time slot t and the $t_i^{reg}$ time slot that requested for processing component i should be much lower than the local execution time. This constraint is given by $|t-t_i^{req}| < \gamma q_i^m$, where $\gamma$ is the weight factor. If the wait time does not exceed the local execution time for component i, then $I_i(t)$ is set to 0 and the component i is set aside to await its turn for execution. However, if $|t-t_i^{req}| \geq \gamma q_i^m$, the component I is flagged for local execution in the next time slot, and will not be considered for offloading again ($c_i(T)=0$).

In addition to updating the rates and latency values for each wireless interface in the time slots, the transmission queue for the next time slot for radio interface k ($\forall$k) needs to be updated as follows:

$$Q_k(t+1) = \max[Q_k(t) - A_k^{mc}(t), 0] + \alpha_k(t) \sum_{i=1}^{N} B_i^{mc}(t) \tag{15}$$

where the first term on the RHS of Eqn (15) represents the data remaining in the queue for interface k, and the second term represents the data arrival at radio interface k in time slot t. Also note that if component i originally scheduled for remote execution is not offloaded at time slot t due to not finding a feasible solution for $OP_{Tx}$ (meaning that energy and time constraints of offloading are not satisfied), then the delay values for transmission of the output data from component i in the mobile to the cloud via wireless interface k will be updated to: $\tau_{i,k}^{mc}(t+1)+1$. This means that, after each time slot, if the scheduled component for remote execution is not offloaded, the delay cost will be updated by the delay value at the next time slot, plus one.

Cloud Transmission Strategy:

Just as in the case of the transmission strategy from the mobile, we also optimize the cloud transmission strategy taking into account delays and energy consumed by the mobile device for receiving this data. We optimally choose the percentage of data that needs to be allocated to each wireless interface to send the necessary information from the cloud to the mobile. To ensure that no cloud Tx buffer overflows, the time-averaged summation of buffer occupancies must remain finite:

$$\bar{S} = \lim_{T \to \infty} \sup \frac{1}{T} \sum_{t=1}^{T} \sum_{k=1}^{K} E\{|S_k(t)|\} < \infty$$

where $S_k(t)$ is the transmission queue via the cloud for wireless interface k at time slot t. The Lyapunov function for the cloud transmission strategy, which also reflects the receiver strategy for the mobile, can be written as $$L(S(t)) = \frac{1}{2} \sum_{k=1}^{K} S_k^2(t)$$

where $S(t)=[S_1(t) S_2(t) \ldots S_K(t)]$. The Lyapunov drift in the data transfer from the cloud to the mobile is expressed as $\Delta_{cm}(S(t))=\Delta E\{L(S(t+1))-L(S(t))|S(t)\}$. This Lyapunov drift is opportunistically minimized, considering the penalty of energy consumed for downlink mobile reception as $\Delta_{cm}(S(t))+V_{cm}E\{E_{com}^{Rx}(t)|S(t)\}$, where Vcm is the control parameter in data transfer from the cloud to the mobile, while the trade-off between the Lyapunov drift of the cloud transmission queue and the penalty of energy consumed for mobile reception ($E_{com}^{Rx}(t)$) is applied, and $$E_{com}^{Rx}(t) = \sum_{k=1}^{K} P_k^{Rx} \sum_{i=1}^{N} \beta_k(t) \tau_{i,k}^{cm}(t),$$

Following Lemma 1, the upper bound of the objective function for the Lyapunov drift of data transfer from the cloud to the mobile is obtained by:

$$\Delta_{cm}(S(t)) + V_{cm}E[E_{com}^{Rx}(t)|S(t)] \leq \frac{(A_{max}^{cm})^2}{2} + \tag{16}$$

$$V_{cm}E\{E_{com}^{Rx}(t) | S(t)\} + \sum_{k=1}^{K} E\left\{S_k(t)\left(\sum_{i=1}^{N} B_i^{cm}(t) - A_k^{cm}(t)\right) \middle| S(t)\right\},$$

where $A_k^{cm}(t)$ represents the data rate transmitted from the cloud to the mobile device through radio interface k at time slot t, $B_i^{cm}(t)$ is the arrival data rate in the cloud transmission buffer at time slot t. $B_i^{cm}(t)$ will include both the data that the cloud transfers due to offload operations of component i as well as other ambient data. Also, $A_{max}^{cm}$ is the maximum data rate from the cloud. After simplifying the upper bound on the RHS of Eqn (16), the objective function of the optimization problem for the cloud transmission strategy, which reflects the mobile reception status, is obtained. The optimal strategy can be written as the solution to the following optimization problem considering the delay constraint from the cloud to the mobile:

$$OP_{Rx}: \max_{\beta} \Omega_{cm}(t) = V_{cm}E_{com}^{Rx} - \sum_{k=1}^{K}(S_k(t)A_k^{cm}(t)), \text{ s.t.} \tag{17}$$

$$\sum_{k=1}^{K} \beta_k(t) \sum_{i=1}^{N} \tau_{i,k}^{cm}(t) \leq T_{th}^{Rx}, \tag{18}$$

$$\sum_{k=1}^{K} \beta_k(t) = 1, \quad \beta_k(t) \geq 0, \forall k, \tag{19}$$

where $\beta=[\beta_1(t) \beta_2(t) \ldots \beta_K(t)]$. Constraints (18) and (19), respectively, ensure that the latency from the cloud to the mobile lies below a certain threshold, $T_{th}^{Rx}$, and that the required data is optimally transmitted from the cloud via multiple interfaces and that the weights sum to unity. Also, the performance bounds for the cloud transmission queue and energy consumed by the mobile receiver, respectively, are given as:

$$\lim_{T \to \infty} \frac{1}{T} \sum_{t=1}^{T} \sum_{k=1}^{K} \bar{S}_i(t) \leq \frac{\frac{(A_{max}^{cm})^2}{2} + V_{cm}E_{com}^{*Rx}}{\varepsilon_{max}}, \tag{20}$$

$$\lim_{T \to \infty} \frac{1}{T} \sum_{t=1}^{T} \bar{E}_{com}^{Rx}(t) \leq \frac{(A_{max}^{cm})^2}{2V_{cm}} + E_{com}^{*Rx}, \tag{21}$$

The offloading strategy (cloud transmission) in the online stage is as follows. For every component i from which data must be received at the mobile device, if the optimization problem $OP_{Rx}$ has a solution for the variable parameter set $\beta$ in the feasible region, then component i is transmitted by the cloud, at time slot, t, via K wireless interfaces at the optimal percentage values $\beta_k^*(t) \forall k$ (e.g. component 3 at time slots $t_3$ in the example of FIG. 3B). If the optimization problem $OP_{Rx}$ does not have a feasible solution, then transmission from the cloud is scheduled for the next time slot. Note that if component i scheduled for remote execution is not transmitted by the cloud to mobile at time slot t, then the delay values of the output data from cloud to mobile for component i via wireless interface k will be updated to: $\tau_{i,k}^{cm}(t+1)+1$. At the end of current time slot t, the data queues in Tx buffer for the cloud at the next time slot for radio interface k ($\forall k$) is updated as follows:

$$S_k(t+1) = \max[S_k(t) - A_k^{cm}(t), 0] + \beta_k(t) \sum_{i=1}^{N} B_i^{cm}(t) \quad (22)$$

Algorithm 1 Cognitive Offloading and Scheduling Heuristic.

1: Offline stage at $t_0$ (optional):
2:   Solve $OP_{off}$ to calculate which components can be offloaded
3:   otherwise all components are analyzed for offloading (except 1, N)
4: Online stage:
5: repeat t → t + 1
6:   Check scheduling constraints given by Eqns (6) & (7)
7:   For offloadable components:
8:     Solve $OP_{Tx}$
9:     if $OP_{Tx}$ has feasible solution then
10:       offload related components with the corresponding values for $\alpha_k(t)$ $\forall k$ obtained by $OP_{Tx}$
11:     else if $|t - t_i^{req}| < \gamma q_i^m$ then
12:       wait for the next time slot to check offloading
13:     else
14:       component i will be scheduled for local execution
15:     end if
16:     Solve $OP_{Rx}$
17:     if $OP_{Rx}$ has feasible solutions then
18:       Send output data from the cloud with corresponding values for $\beta_k(t)$ $\forall k$ obtained by $OP_{Rx}$
19:     else
20:       Do not send data from cloud and wait for the next slot
21:     end if
22:   For the components scheduled for local execution:
23:     if local execution constraint given by Eqn (23) is satisfied then
24:       Execute component i locally at time slot t
25:     end if
26:   Update $Q_k(t+1)$ $\forall k$ using Eqn (15)
27:   Update $S_k(t+1)$ $\forall k$ using Eqn (22)
28:   Add delay ($\tau_{i,k}^{mc}(t+1)$ $\forall k$) for waiting components in the mobile
29:   Add delay ($\tau_{i,k}^{cm}(t+1)$ $\forall k$) for waiting components in the cloud
30: until t = T.

Local Execution:

As mentioned earlier, some components are selected for local execution (e.g. components 1, 4 and 5 at time slots $t_1$, $t_2$, and $t_4$, respectively, in the example of FIG. 3B). Although the cloud can execute several components in parallel, we assume that the mobile device processes components serially. In order to schedule component i on the mobile device, at the current time slot, t, we need to ensure that no other application's component is currently running on the mobile. This is expressed as:

$$\sum_{i=1}^{N} \sum_{s=t-1-q_i^m}^{t-1} X_i(s) < 1. \quad (23)$$

Performance Analysis

In this section, we first introduce the evaluation setup for the performance analysis of the proposed cognitive offloading and scheduling heuristic. Then the methods for comparisons are introduced. Finally, results of the simulation results are provided and discussed.

Real Data Measurements and Simulation Setup

All our experiments were run on an Android HTC Vivid smartphone. This device is equipped with a 1.2 GHz dual-core processor. Although our theory is developed for a general, K, number of radio interfaces, our experiments were conducted using two wireless radio interfaces for cloud offloading: WiFi and LTE (K=2). The Amazon Elastic Compute Cloud (Amazon EC2) was used for cloud computing July 2014. [Online]. Available: http://aws.amazon.com/ec2/.

Figure 8:
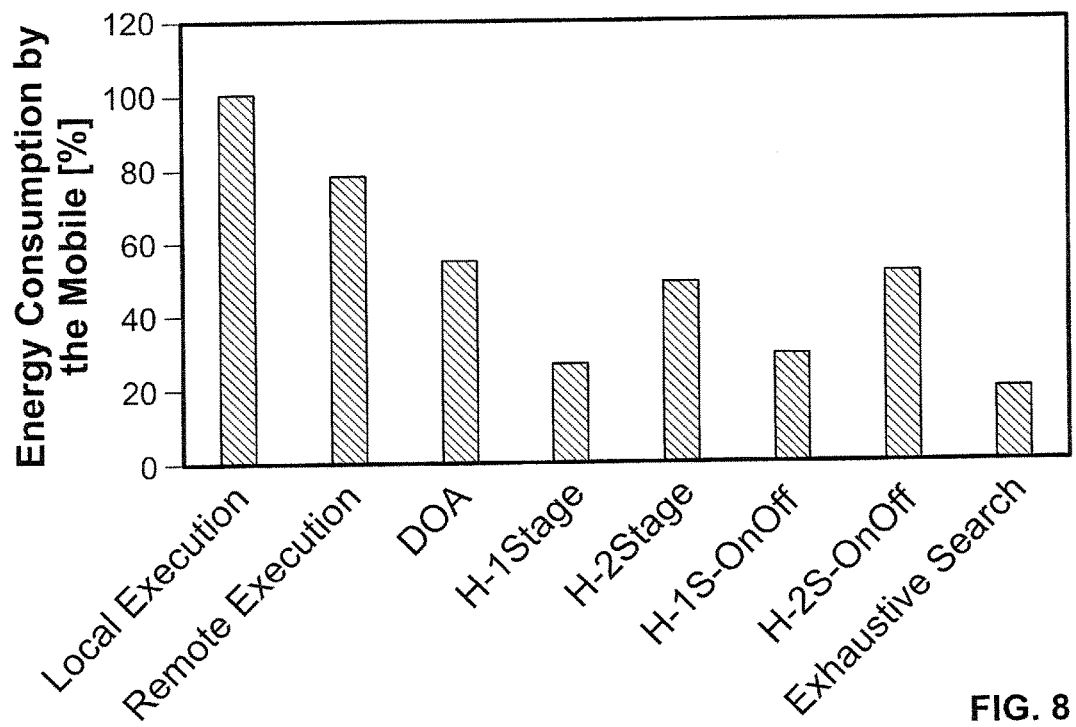
FIG. 8 is a graph of total energy consumed by the mobile device for the proposed and classical schemes, normalized to the energy consumed by local execution (using the face recognition application in [Online]. Available: http://darnok.org/programming/face-recognition/.)
Figure 9:
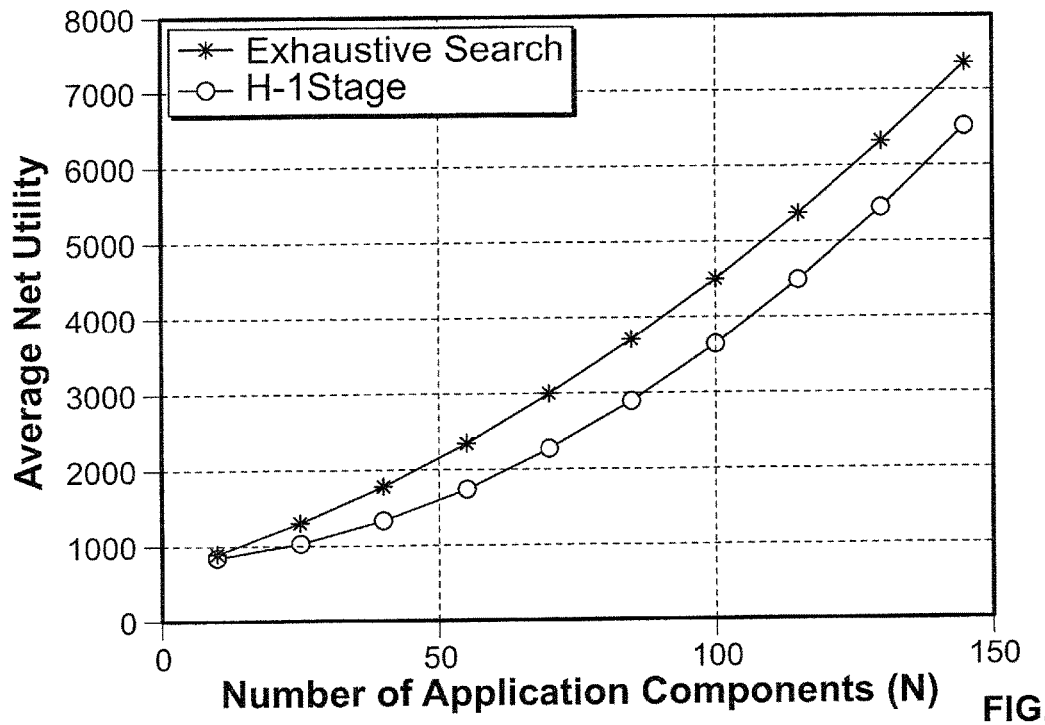
FIG. 9 is a graph of average net utility versus number of application's components where CDGs are based on a random graph of Fan-in/Fan-out (execution deadline of the application=1330 ms).

In all the simulations, except the simulations in FIGS. 8 and 9, a 14-component video navigation mobile application (N=14) was used, in which four components are used for graphic features, see March 2014. [Online]. Available: http://www.opengl.org/; three are used for face detection, see July 2014. [Online]. Available: http://www.developer-.com/ws/android/programming/face-detection-with-android-apis.html six are used for video processing, see April 2014. [Online]. Available: http://opencv.org/; and the last component is used for clustering the video points and showing the output results. FIG. 3A shows the CDG for this real application. In the simulations of FIG. 9, synthetic applications with arbitrary CDGs were used in order to test the proposed scheme for large number of components, as well as, different types of CDG structures, see D. Cordeiro, G. Mounié, S. Perarnau, D. Trystram, J.-M. Vincent, and F. Wagner, "Random graph generation for scheduling simulations," *Proceedings of the International ICST Conference on Simulation Tools and Techniques*, vol. 10, no. 60, pp. 60:1-60:10, 2010. Also in FIG. 8, the face recognition application in [Online]. Available: http://darnok.org/programming/face-recognition/ was used. We measured the data size, execution time and active power of the components in the HTC phone. The wireless parameters such as uplink and downlink rates in each time slot, packet latencies, and the power consumed for transmission and receiving in each time slot were measured. The average wireless service rates were obtained by using the TCPdump tool, see September 2014. [Online]. Available: http://www.tcpdump.org/. This function can also be performed by OPNET (www.opnet.com). Also, we added a Poisson distributed background arrival data in the mobile device at each time slot, see P. Shu, F. Liu, H. Jin, M. Chen, F. Wen, and Y. Qu, "eTime: Energy-efficient transmission between cloud and mobile devices," in *IEEE Proceedings of INFOCOM*, April 2013, pp. 195-199 to simulate ambient traffic not related to this particular application. The average transmission and reception power levels of the mobile device for WiFi service are respectively 257.83 and 123.74 mW, and for LTE service are respectively 356.1 and 197.1 mW. The active and idle power levels of the phone are 644.9 and 22 mW, respectively. These power measurements were obtained by using CurrentWidget: Battery monitor application, see April 2014. [Online]. Available: http://opencv.org/. The local execution time of the fourteen components (for the 14-component application) were measured as [30, 340, 345, 125, 30, 80, 70, 30, 185, 125, 650, 571, 904, 56] ms. Since processing of the components in the mobile device is performed serially, the local execution time for the application is simply the sum of the processing times of the individual components (3541 ms). We set the duration for each time slot (x) as 35 ms; that is, the online stage ran every 35 ms. The graphs obtained in this section are averages of 1000 independent runs.

Versions of the Proposed Heuristics

We compare the proposed strategy to several other scenarios (1) no offload (mobile-only) execution, (2) all offload (cloud-only) execution, (3) the dynamic offloading algorithm (DOA) in D. Huang, P. Wang, and D. Niyato, "A dynamic offloading algorithm for mobile computing," *IEEE Transactions on Wireless Communications*, vol. 11, no. 6, pp. 1991-1995, June 2012, and several variants of offload strategies that we propose below:

Exhaustive Search:

In this scheme, the proposed optimization problem is solved using brute force—by evaluating all possibilities and picking the best value. This gives an upper bound of performance for all algorithms. There is no offline stage to select the preferred components for offloading, and all components can potentially be offloaded in the online stage (except components 1 and N). Also the optimal offloading strategy in the heuristic for multi-RATs is obtained by searching exhaustively over all possible transmission strategies to guarantee the maximum net utility rather than using $OP_{Tx}$, $OP_{Rx}$ for multi-RATs (Subsections 1 and 2 in Section IV). Note that this exhaustive search also includes the local execution of components. This method is computationally prohibitive for large and complex applications but serves as a benchmarking tool. This is provided here only to give an idea of the performance of the heuristics vis-a-vis the optimal solution.

Proposed Heuristic with No Offline Stage (H-1Stage):

This strategy essentially eliminates the offline stage and proceeds with the rest of the heuristic algorithm where all components are eligible for offloading.

Two-Stage Heuristic Algorithm (H-2Stage):

This is the proposed algorithm in which the pre-processing stage described above is used to eliminate some of the components from being considered for offloading. While this reduces the time complexity because fewer components are processed in the heuristic, it may eliminate some eligible components from being considered for offloading in the online stage, thereby sacrificing the net utility. The assignment of preferred components for offloading is performed using the optimizing strategy ($OP_{off}$) mentioned above. Note that since the offline optimization problem ($OP_{off}$) does not use instantaneous values of the parameters, this scheme will be suboptimal in comparison to H-1Stage. However, there are fewer components for offloading, so system complexity is lower and the algorithm is faster.

Proposed Single Stage Heuristic Under On-Off Model for the Wireless Interfaces (H-1S-OnOff):

In this scheme, we use the proposed single stage heuristic algorithm, where all components are considered for offloading at the online stage, but we only offload the components using one of the wireless interfaces. We select the wireless interface with the best characteristics for that time slot. Although D. Huang, P. Wang, and D. Niyato, "A dynamic offloading algorithm for mobile computing," *IEEE Transactions on Wireless Communications*, vol. 11, no. 6, pp. 1991-1995, June 2012. and P. Shu, F. Liu, H. Jin, M. Chen, F. Wen, and Y. Qu, "eTime: Energy-efficient transmission between cloud and mobile devices," in *IEEE Proceedings of INFOCOM*, April 2013, pp. 195-199, also use On-Off model for the wireless interface, they are different from this proposed variant. In P. Shu, F. Liu, H. Jin, M. Chen, F. Wen, and Y. Qu, "eTime: Energy-efficient transmission between cloud and mobile devices," the entire application is offloaded and only the cloud strategy is optimized; moreover, it is not a joint scheduling-offloading scheme in that, it does not determine the scheduling order for the components but rather uses a pre-determined, serial execution order for the components. Also, D. Huang, P. Wang, and D. Niyato, "A dynamic offloading algorithm for mobile computing," is not an online strategy.

Proposed Two-Stage Heuristics with ON/OFF Wireless Interfaces (H-2S-OnOff):

In this scheme, we use the two-stage algorithm for offloading, but we only use the wireless interface with the best characteristics for data transfers of both the mobile to cloud and the cloud to mobile.

Results and Discussion

Figure 4:
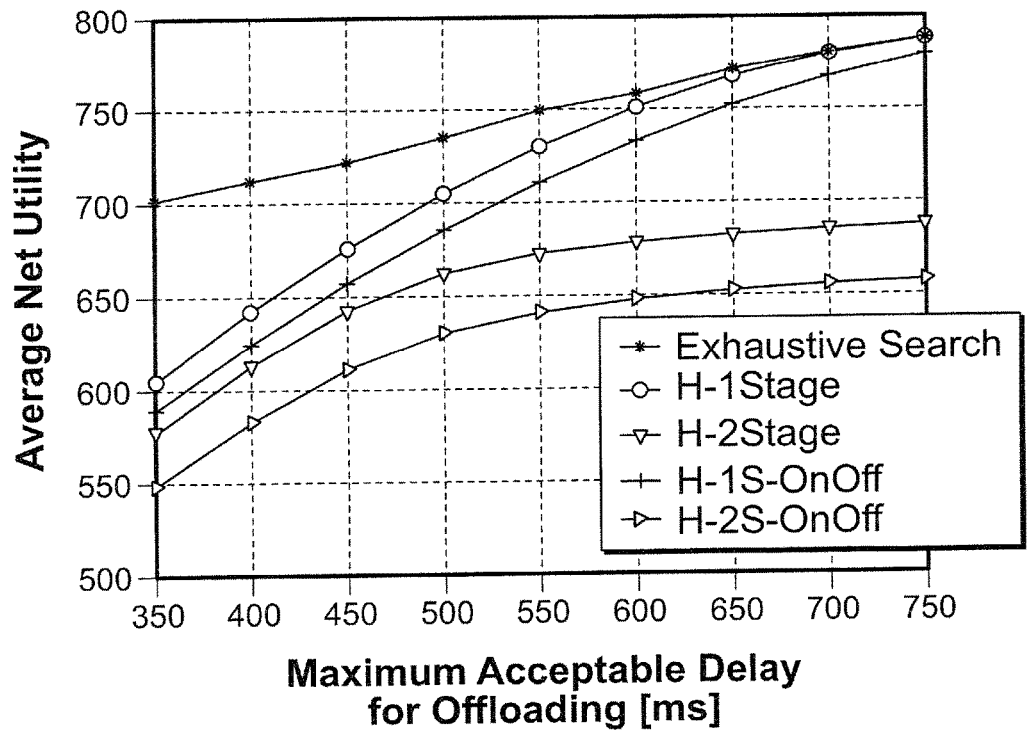
FIG. 4 is a graph of average net utility versus maximum acceptable delay for computation offloading.
Figure 5:
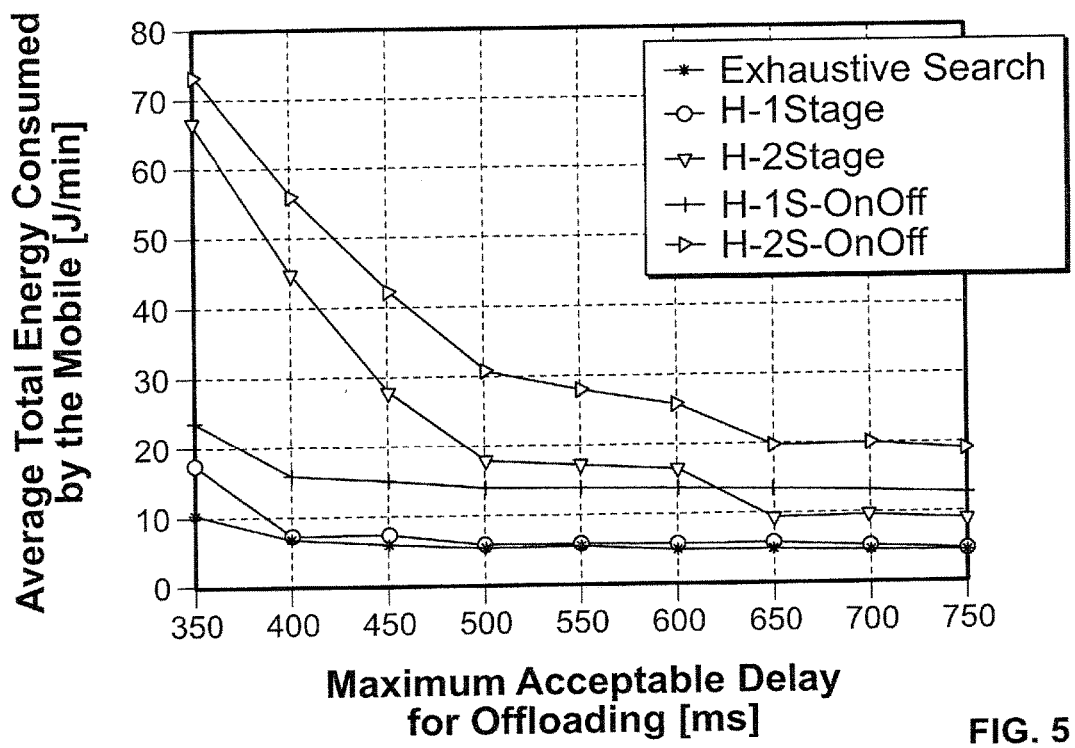
FIG. 5 is a graph of average energy consumed by the mobile device vs. maximum acceptable delay for computation offloading.
Figure 6:
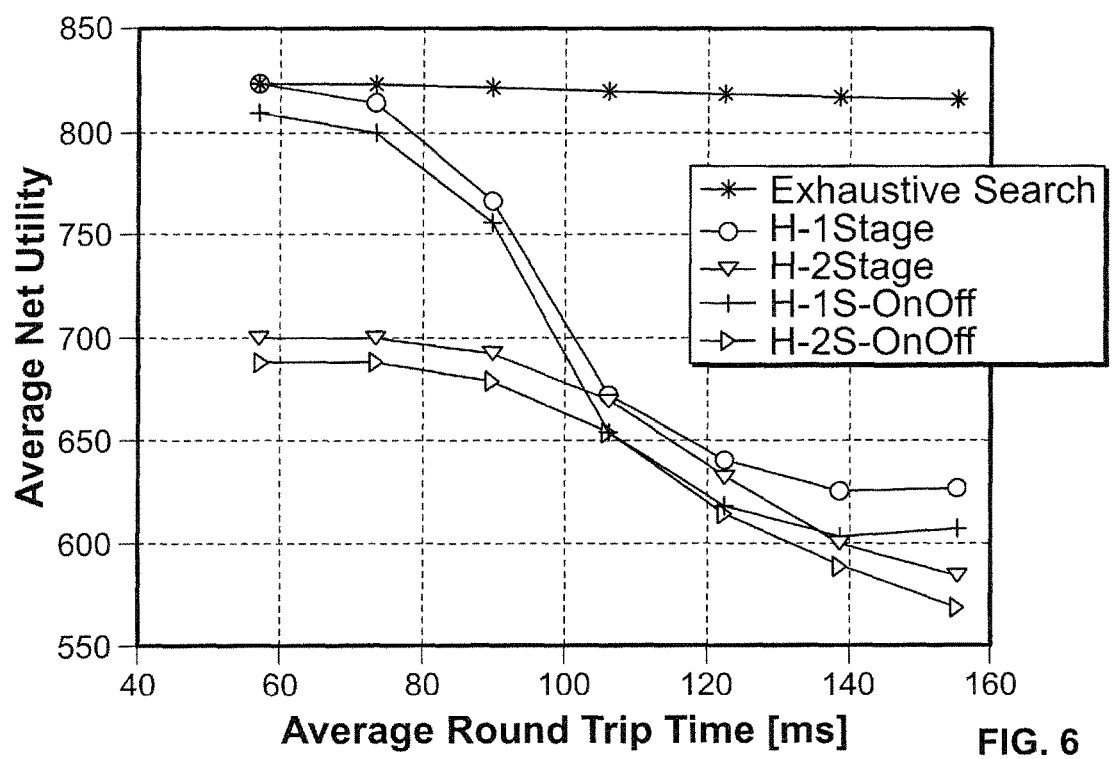
FIG. 6 is a graph of average net utility versus average round trip time (execution deadline of the application=1330 ms, time threshold for offloading=550 ms).
Figure 7:
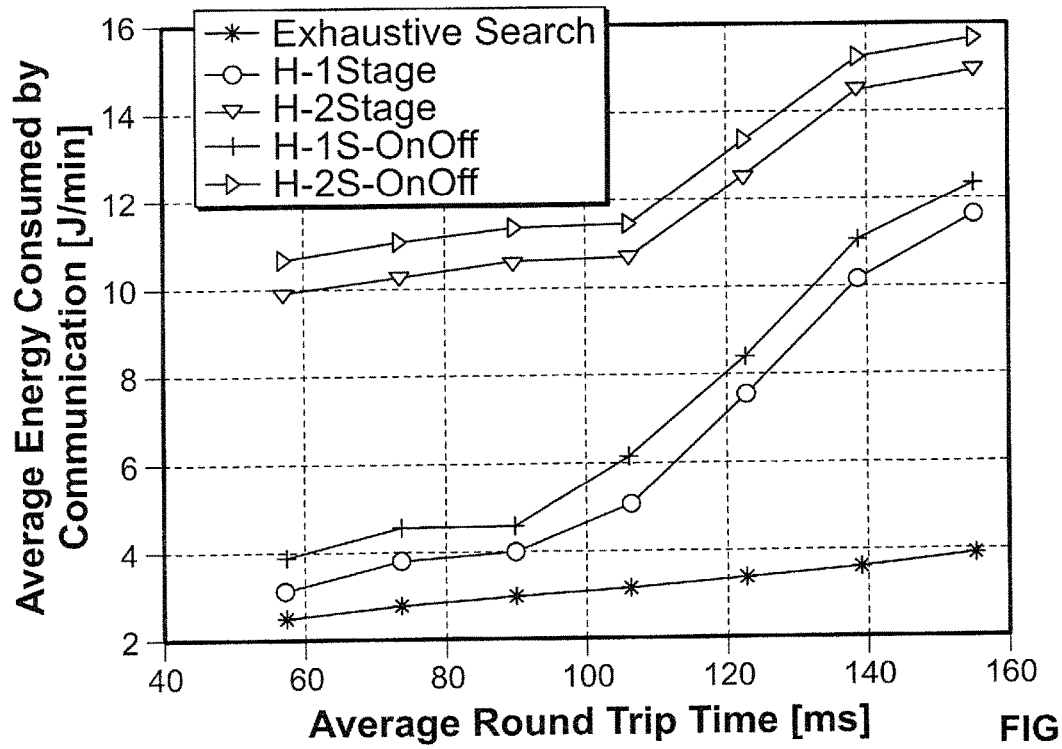
FIG. 7 is a graph of average energy consumed for communication versus average round trip time (execution deadline of the application=1330 ms, time threshold for offloading=550 ms).

We first study the average net utility (Eqn (1)) as a function of maximum acceptable delay for offloading (Tth) for the five schemes (see FIG. 4). We set the execution deadline of the application (x×T) to 1330 ms (much lower than application runtime which is 3541 ms), and the transmission time threshold $T_{th}^{Tx}$ and the reception time threshold $T_{Th}^{Rx}$ respectively to 55% and 45% of the maximum acceptable delay for offloading ($T_{th}$). It is observed that while the maximum acceptable delay of wireless interfaces increases, more components are scheduled to be offloaded, more resources are saved, and the mobile device achieves higher net utility. The plots in this figure also show that we achieve the highest net utility using the proposed multi-RAT optimized single stage heuristics. Note also, that the proposed single stage heuristics that operates in an ON-OFF mode performs better than the two-stage heuristics. Note that as the maximum acceptable delay for offloading increases, the proposed heuristics converges to the optimal solution obtained by the exhaustive search solution. In FIG. 5, we plot the time average of the total energy consumed by the mobile device versus the maximum acceptable delay for offloading. Note that the total energy is the sum of mobile active energy, energy consumed during communication, and the idle energy of the mobile device. The trend observed here is similar to that which was observed in the net utility: as the acceptable offload delay increases, the energy consumed by the mobile device also decreases. We can also see that for higher acceptable delays, H-2Stage consumes less energy compared to H-1S-OnOff. This shows that using cognitive networking in this range consumes less energy even when the suboptimal offline stage in H-2Stage is used. In FIG. 6, the average net utility (Eqn (1)) is illustrated as a function of the average round trip time (RTT). This RTT is calculated on mean values of delays (in units of time slot) over WiFi ($\tau_{i,1}^{mc}(t)$, $\tau_{i,1}^{cm}(t)$, $\forall i$, t) and LTE ($\tau_{i,2}^{mc}(t)$, $\tau_{i,2}^{cm}(t)$, $\forall i$, t) interfaces. The execution deadline of the application (x×T) and the maximum acceptable delay for offloading (x×$T_{th}$) are set to 1330 ms and 550 ms, respectively. It is observed that while delay increases, the energy and time costs for cloud offloading increase, and therefore the average net utility decreases in all five schemes. We can see that again the proposed scheme with cognitive networking outperforms the schemes with ON-OFF link strategy. Note that although H-2Stage uses offline stage to decrease the system complexity, it gives higher net utility in comparison to H-1S-OnOff in the upper ranges of latencies because of cognitive cloud offloading. However, in lower ranges of average latency, the impact of error in the estimation of offloaded components at the offline stage in H-2Stage is higher than impact of cognitive offloading. Therefore, we see H-1S-OnOff achieves higher net utility in comparison to H-2Stage in these ranges. Also in FIG. 7, the five schemes are plotted for comparison of average energy consumed for offloading versus the average RTT. We can see that while latency increases, more energy is consumed for communication. In FIG. 8, we compare the total energy consumption of the five proposed schemes with three other schemes: (i) the scheme where all the components are executed locally; (ii) the scheme where all the components are offloaded for remote execution; and (iii) the dynamic offloading algorithm (DOA) proposed in D. Huang, P. Wang, and D. Niyato, "A dynamic offloading algorithm for mobile computing," *IEEE Transactions on Wireless Communications*, vol. 11, no. 6, pp. 1991-1995, June 2012, which uses ON-OFF multi-RAT strategy. In the simulations for this figure, a face recognition application with 10 sequential components was utilized, see [Online]. Available: http://darnok.org/programming/face-recognition/. WiFi and 3G interfaces were used for this bar graph, the wireless network parameters in [Online]. Available: http://www.3gpp.org/ftp/tsg-ran/wg4-radio/. are used such that exactly the same parameters used for the simulation of DOA in D. Huang, P. Wang, and D. Niyato, "A dynamic offloading algorithm for mobile computing," *IEEE Transactions on Wireless Communications*, vol. 11, no. 6, pp. 1991-1995, June 2012, were used for all the other seven schemes. This comparison is normalized to the scheme with local execution of all the components. It is observed that H-1Stage consumes 73%, 51%, 28%, and 3% less energy in comparison to the schemes using local execution, remote execution, DOA, and H-1S-OnOff, respectively. Also, H-1Stage consumes 8% more energy in comparison to the best case scenario obtained using exhaustive search. We can also compare the performances of the schemes that use offline stage (H-2Stage, H-1S-OnOff, and DOA) in one category. H-2Stage consumes 2.5% and 6% less energy in comparison to H-1S-OnOff and DOA, respectively. H-2Stage outperforms H-2S-OnOff because it takes advantage of cognitive networking. Although the initial offline solution is applied in all the three schemes, the strategy can be modified in the online stage for H-2Stage and H-2S-OnOff. Therefore, using either of these schemes consumes less energy than using DOA. So far, we have used specific mobile applications with 10 and 14 components. We now investigate the scalability of our approach w.r.t the number of components in the application. FIG. 9 plots the average net utility as a function of the number of application components. We tested this experiment for random applications with [10, 25, 40, 55, 70, 85, 100, 115, 130, 145] components, while the corresponding CDGs were obtained based on a random Fan-in/Fan-out graph with in-degree and out-degree of one, see D. Cordeiro, G. Mounié, S. Perarnau, D. Trystram, J.-M. Vincent, and F. Wagner, "Random graph generation for scheduling simulations," *Proceedings of the International ICST Conference on Simulation Tools and Techniques*, vol. 10, no. 60, pp. 60:1-60:10, 2010. The maximum acceptable delay for offloading and RTT are set to 550 ms and 100 ms, respectively. In order to maintain the same probability distribution of our measurements when scaling up the application, we calculated the histogram of the current real data measurements ($q^m$, $q^c$, $P^m$, $\forall i$) from the 14-component video navigation application. Using the obtained distribution, we generated the new data for applications with a greater number of components. We see that while the number of components increases, the complexity of the application (higher execution times and more component dependencies) increases so that higher net utility is saved.

Figure 10:
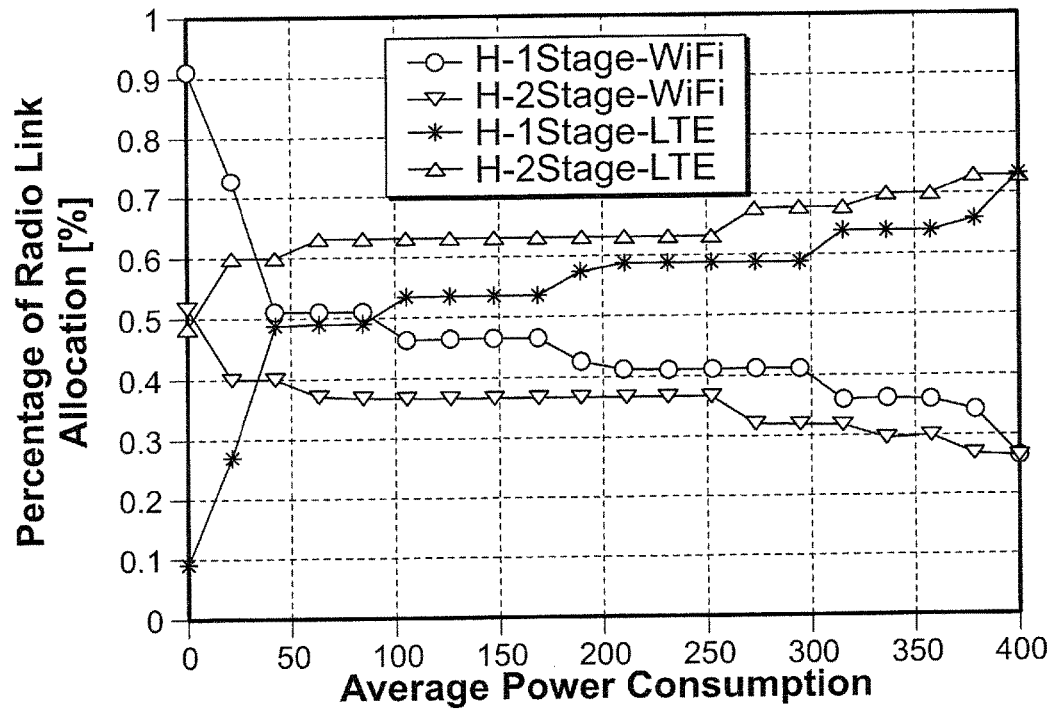
FIG. 10 is a graph of percentage of radio interface allocation versus time average power consumption for WiFi transmission by the mobile device.
Figure 11:
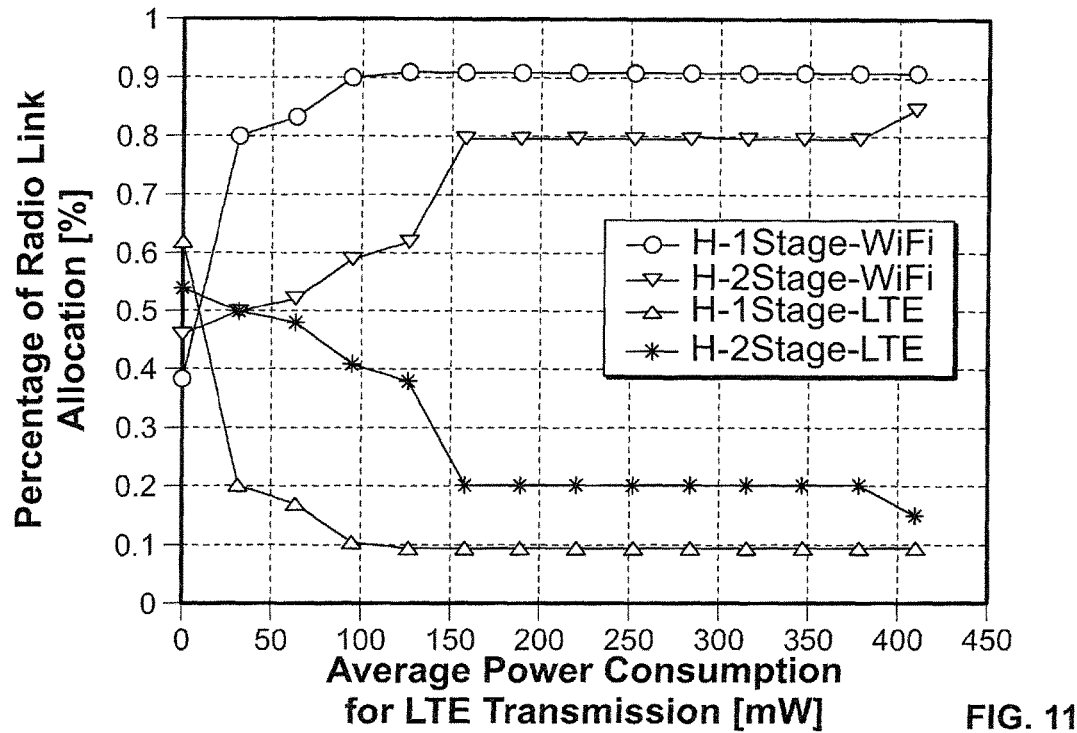
FIG. 11 is a graph of percentage of radio interface allocation vs. time average power consumption for LTE transmission by mobile device.
Figure 12:
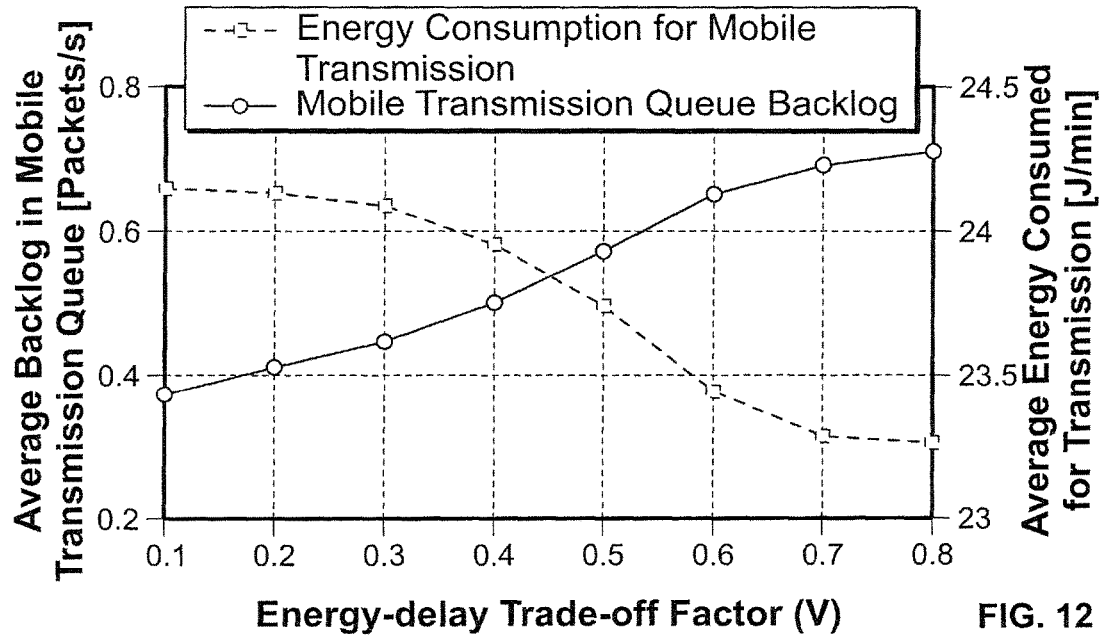
FIG. 12 is a graph of the impact of energy-delay trade-off factor on the average values of transmission queue backlog and energy consumed for transmitting the offloaded data (the maximum acceptable delay for offloading=550 ms, execution deadline of the application=1330 ms).
Figure 13:
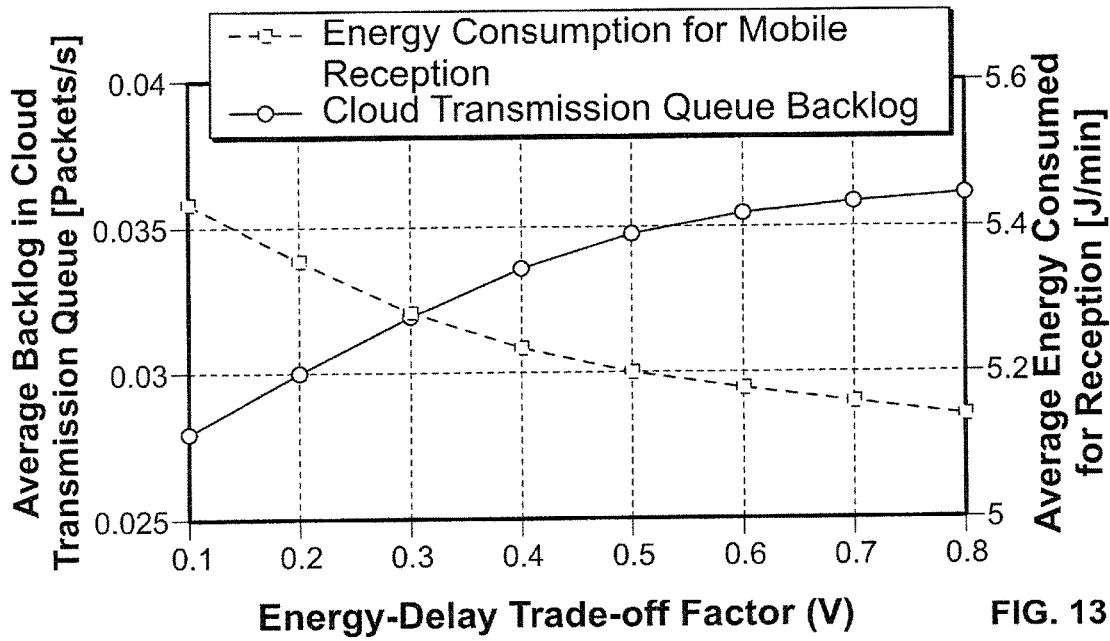
FIG. 13 is a graph of the impact of energy-delay trade-off factor on the average values of cloud transmission queue backlog and energy consumed for receiving the offloaded data (maximum acceptable delay for offloading=550 ms, execution deadline of the application=1330 ms).

FIGS. 10 and 11 show the percentages of radio interface allocation for both WiFi and LTE versus the time-average transmit power of WiFi and LTE interfaces, respectively. Execution deadline of the application, the maximum acceptable delay for offloading, and RTT are set to 1330 ms, 550 ms and 100 ms, respectively. In FIG. 10, results show that when the WiFi transmit power increases, the percentage of WiFi allocation decreases and percentage of LTE interface allocation increases. We can see that in the very low ranges of WiFi transmit power, much higher percentages of WiFi are allocated for offloading in the H-1Stage in comparison to those of H-2Stage. On the other hand, in upper ranges of WiFi transmit power, we observe that the performance of both schemes are close to each other while the components decided for offloading are almost the same. In FIG. 11, we observe that when average LTE transmit power increases, the percentage of interface allocation for LTE decreases and percentage of interface allocation for WiFi increases. In FIGS. 12 and 13, queue backlogs of mobile transmission buffers and cloud transmission buffers are presented respectively as functions of the trade-off control factors for energy and delay ($V=V_{ul}=V_{cm}$) where the H-1Stage scheme is applied. Application deadline, the maximum acceptable delay, and RTT are set to 1330 ms, 550 ms and 100 ms, respectively. In the same plots, the energy values consumed by the mobile device to transmit and receive offloaded data are presented. Looking at Eqns (10) and (17), we can see that Lyapunov control parameter, V, reflects the weight of transmission (reception) energy by the mobile device in comparison to the aggregated queue backlog for transmission to (from) the cloud through all radio interfaces. We observe that when the V increases, the queue backlog increases and less energy is consumed by the mobile device for offloading. The intersection points in these plots show the value of V that achieves minimum transmission (reception) energy while sending (receiving) the highest amount of data for offloading.

Figure 14:
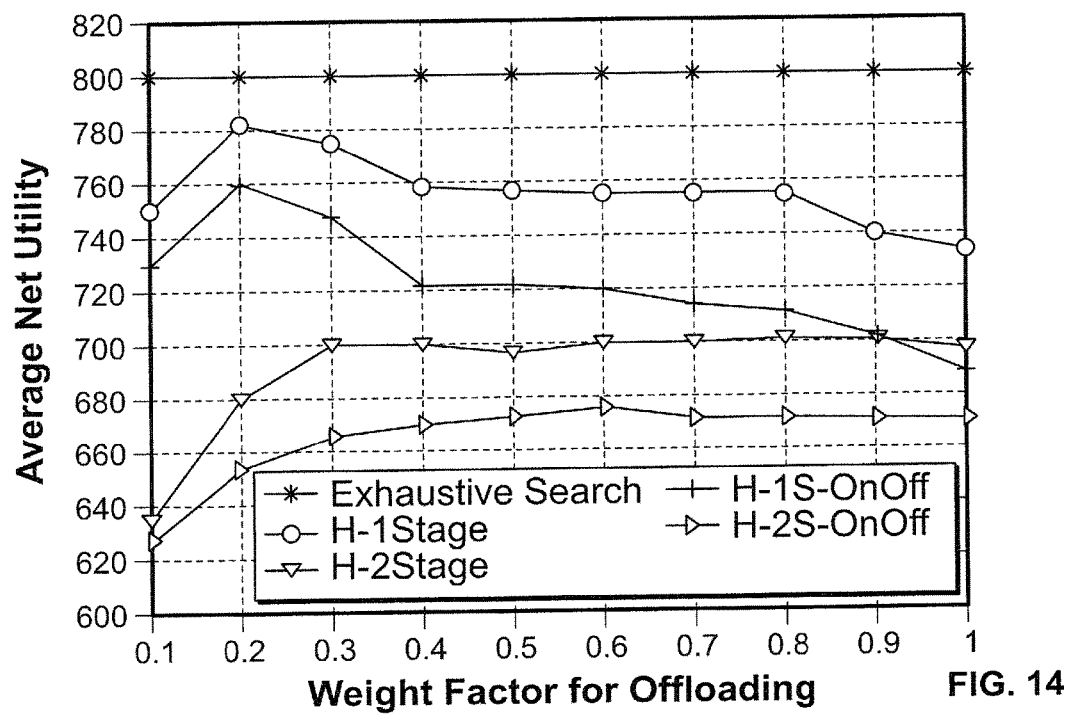
FIG. 14 is a graph of average net utility versus weight factor for offloading, $\gamma$ (the maximum acceptable delay for offloading=550 ms, execution deadline of the application=1330 ms).

Finally, FIG. 14 shows the time-averaged net utility as a function of the weight factor to adjust the wait time for offloading (γ) in the five schemes. Execution deadline of the application, the maximum acceptable delay, and RTT are set to 1330 ms, 550 ms, and 100 ms, respectively. When the weight factor increases, the time to wait for offloading the components increases. The γ value that gives the maximum net utility for the H-1Stage, H-1S-OnOff, H2Stage and H2S-OnOff are 0.2, 0.2, 0.3, and 0.6, respectively. However, we observe that the net utility changes by less than 1.25% in the exhaustive search scheme with γ.

CONCLUSION

The present disclosure presents a new concept of cognitive cloud offloading and introduces online heuristic strategies for computation offloading of multi-component applications in multi-RAT enabled mobile devices. The changes in wireless parameters at all available interfaces (e.g., rate, delay, power) are taken into account while determining the scheduling order of the multiple components of the application with arbitrary component dependency graphs. To obtain the best strategies for uplink and downlink offloading, the percentages of data to be sent by the mobile and the cloud via each wireless interface are updated at each time slot. The present disclosure presents a comprehensive model for the net utility. Satisfying the constraints for schedule order of applications with arbitrary CDGs, the strategy for either offloading or locally executing the components is provided in each time slot using the updated knowledge of wireless parameters. Note that queue stabilities of the mobile and cloud transmission buffers for aggregated interfaces are guaranteed in the offloading strategy. We analyzed performance of the heuristic strategy with real data measurements using a video navigation application on an HTC Vivid smartphone. The computations were offloaded via two wireless interfaces of WiFi and LTE to the Amazon EC2 cloud. Several versions of the heuristic strategy were compared with the globally optimal scheme (obtained by exhaustive search), a recent strategy in dynamic computation offloading, see D. Huang, P. Wang, and D. Niyato, "A dynamic offloading algorithm for mobile computing," *IEEE Transactions on Wireless Communications*, vol. 11, no. 6, pp. 1991-1995, June 2012, and the classical strategies where all the components are executed locally and remotely. We observed that our proposed strategy (H-1Stage) consumes 28%, 51%, and 73% less energy in comparison to DOA, remote execution scenario, and local execution scenario, respectively. Also, it consumes only 8% more energy than the optimal solution (obtained via exhaustive search). We also noticed that using the cognitive cloud offloader, percentage allocation of radio interfaces quickly adapts according to changes in rates and delay values from each radio. Moreover, we tested scalability of the proposed scheme by increasing the number of components up to 145 where CDGs are used randomly with Fan-in/Fan-out graphs.

The present disclosure has been expressed in the context of cognitive computation offloading, joint scheduling-of-floading, mobile cloud computing, multi-RAT offloading, and spectrum aware mobile computing. It will be understood that the embodiments described herein are merely exemplary and that a person skilled in the art may make many variations and modifications without departing from the spirit and scope of the claimed subject matter. All such variations and modifications are intended to be included within the scope of the disclosure.

We claim:

1. A method for executing a plurality of executable processing components of an application program and data used by the application program between a first computer and at least one second computer, the first computer and the at least one second computer being connected by a plurality of radio interfaces, said method comprising the steps of:
    (A) automatically identifying a first set of the executable processing components of the application program and data used by the application program to be offloaded to the at least one second computer for execution;
    (B) automatically ascertaining which of the plurality of radio interfaces for performing the step of offloading to the at least one second computer;
    (C) determining the relative percentage of the executable processing components and data that are to be communicated on each of the plurality of radio interfaces;
    (D) offloading the first set of the executable processing components and the data identified in step (A) from the first computer to the at least one second computer over at least one of the plurality of radio interfaces;
    (E) executing, in the at least one second computer, at least a portion of the first set of the executable processing components offloaded in step (D), producing processed data;
    (F) communicating the processed data produced by step (E) to the first computer; and
    (G) executing, in the first computer, a second set of the executable processing components of the application program using the processed data communicated in step (F),
    wherein the execution of the at least a portion of the first set of the executable processing components in the at least one second computer is performed in parallel with the execution of the second set of the executable processing components in the first computer.

2. The method of claim 1, wherein the second set of the executable processing components are executed in the first computer at the same time as the execution of the at least a portion of the first set of the executable processing components in the at least one second computer, whereby parallel processing of the application program occurs in the first computer and the at least one second computer.

3. The method of claim 1, wherein the step of automatically identifying is based in part upon CPU utilization in the first computer.

4. The method of claim 1, wherein the step of automatically identifying is based in part upon memory utilization in the first computer.

5. The method of claim 1, wherein the step of automatically ascertaining is based in part upon connectivity strength of each of the plurality of radio interfaces.

6. The method of claim 1, wherein the step of automatically ascertaining is based in part upon data flow capacity of each of the plurality of radio interfaces.

7. The method of claim 1, wherein the first computer is a mobile computing device and the at least one second computer is a server computer.

8. The method of claim 1, wherein the step of automatically identifying is based in part upon connectivity strength and data flow capacity of each of the plurality of radio interfaces.

9. The method of claim 8, wherein the step of automatically identifying is based in part upon a cumulative connectivity strength and data flow capacity of the plurality of radio interfaces at a given time (t).

10. The method of claim 1, wherein the step of automatically identifying is re-evaluated at a plurality of times (t), (t+1) ... ($t_{final}$), until completion of the application program.

11. The method of claim 1, wherein the step of automatically ascertaining is re-evaluated at a plurality of times (t), (t+1) ... ($t_{final}$), until completion of the application program.

12. The method of claim 1, wherein the step of determining is conducted at a plurality of times (t), (t+1) ... ($t_{final}$), until completion of the application program.

13. The method of claim 1, wherein at least one of the first computer and the at least one second computer is connected to a network, the steps of offloading and communicating utilizing the network in addition to the plurality of radio interfaces.

14. The method of claim 1, wherein the step of offloading is conducted over at least two of the plurality of radio interfaces simultaneously.

15. The method of claim 14, wherein the step of offloading is conducted over all available radio interfaces simultaneously.

16. The method of claim 14, wherein the step of communicating is conducted over all available radio interfaces simultaneously.

17. The method of claim 1, wherein the step of identifying is based in part on the comparative amounts of energy consumed by executing a given processing component on the first computer compared to amount of energy used in the steps of offloading and communicating.

18. The method of claim 1, further comprising the step of scheduling the offloading and execution of each of the plurality of executable processing components of the application program based at least partly on a dependency of the plurality of executable processing components one to another.

19. The method of claim 18, wherein the dependency of the plurality of components is modeled by a component dependency graph.

20. The method of claim 1, wherein the steps of identifying and ascertaining are partly based on the data communication capacity from the at least one second computer to the first computer during the step of communicating.

21. The method of claim 20, further comprising the step of automatically ascertaining which of the plurality of radio interfaces are used to perform the step of communicating the processed data produced by step (E) to the first computer.

22. The method of claim 1, wherein the step of automatically identifying is based in part upon a battery life of the first computer.

23. The method of claim 1, wherein the step of offloading is conducted opportunistically with offloading occurring while at least one radio interface is operational, ceasing when no radio interface is operational and resuming when at least one radio interface becomes operational.

24. The method of claim 1, wherein at least a portion of the executable processing components is executed in the first computer and another portion of the executable processing components is executed in the at least one second computer, the execution of executable processing components in the first computer and the at least one second computer occurring opportunistically, such that interruptions in the operability of the plurality of radio interfaces does not impede execution of steps of the executable processing components that are executable without further communication between the first computer and the at least one second computer and allowing for parallel processing of the application program in the first computer and the at least one second computer.

25. The method of claim 1, wherein the dependency of the plurality of executable processing components of the application program is modeled by a component dependency graph; and wherein the first set of the executable processing components of the application program is identified during the performance of step (A) based on the component dependency graph.

26. The method of claim 1, wherein each of the first and second sets of the executable processing components is a subset of the executable processing components of the application program; and wherein the execution of the first set of the executable processing components in the at least one second computer and the second set of the executable processing components in the first computer is performed based on a component dependency graph of the executable processing components.

27. The method of claim 1, wherein only the first set of the executable processing components of the application program are offloaded to the at least one second computer during the performance of step (D) for execution.

* * * * *